US012387684B2

(12) United States Patent
Zhang

(10) Patent No.: US 12,387,684 B2
(45) Date of Patent: Aug. 12, 2025

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd, Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/542,981

(22) Filed: Dec. 18, 2023

(65) Prior Publication Data

US 2024/0119903 A1 Apr. 11, 2024

(30) Foreign Application Priority Data

Dec. 19, 2022 (CN) ......................... 202211635676.9

(51) Int. Cl.
*G09G 3/3258* (2016.01)
*G09G 3/3266* (2016.01)

(52) U.S. Cl.
CPC ......... *G09G 3/3258* (2013.01); *G09G 3/3266* (2013.01); *G09G 2300/0819* (2013.01); *G09G 2300/0847* (2013.01); *G09G 2310/0286* (2013.01); *G09G 2310/061* (2013.01); *G09G 2320/0257* (2013.01)

(58) Field of Classification Search
CPC ............... G09G 3/3258; G09G 3/3266; G09G 2300/0819; G09G 2300/0847; G09G 2310/0286; G09G 2310/061; G09G 2320/0257
See application file for complete search history.

(56) References Cited

U.S. PATENT DOCUMENTS

| | | | | |
|---|---|---|---|---|
| 11,361,713 B1 * | 6/2022 | Fu | ........................ | G09G 3/3241 |
| 2017/0178570 A1 * | 6/2017 | Wu | ...................... | G09G 3/3291 |
| 2021/0407383 A1 * | 12/2021 | Lai | ........................... | G09G 3/32 |
| 2024/0005842 A1 * | 1/2024 | Zhang | ...................... | G09G 3/32 |
| 2024/0078972 A1 * | 3/2024 | Zhang | .................. | G09G 3/3233 |

FOREIGN PATENT DOCUMENTS

| | | |
|---|---|---|
| CN | 111462694 A | 7/2020 |
| CN | 113707090 A | 11/2021 |

* cited by examiner

*Primary Examiner* — Lixi C Simpson
(74) *Attorney, Agent, or Firm* — KDW Firm PLLC

(57) ABSTRACT

A display panel includes a pixel circuit including a drive module, a reset module, and a compensation module, a first terminal of the drive module is coupled to the light-emitting element to provide a drive current for the light-emitting element, and the drive module includes a drive transistor; the reset module is connected between a reset signal terminal and a control terminal of the drive module to provide a reset signal for the drive module; and the compensation module is connected between the control terminal of the drive module and the first terminal of the drive module to compensate a threshold voltage of the drive transistor; in the reset stage, the reset module is turned on; in the compensation stage, the compensation module is turned on; and a partial time period of the reset stage coincides with a partial time period of the compensation stage.

19 Claims, 19 Drawing Sheets

DISPLAY PANEL AND DISPLAY DEVICE

CROSS-REFERENCE TO RELATED APPLICATION(S)

This application claims the priority of Chinese Patent Application No. 202211635676.9, filed on Dec. 19, 2022, the disclosure of which is incorporated herein by reference in its entirety.

TECHNICAL FIELD

The present disclosure relates to the field of display technologies and, in particular, a display panel and a display device.

BACKGROUND

In a display panel, a pixel circuit provides a drive current for display for a light-emitting element of a display panel and controls whether the light-emitting element enters a light-emitting stage, so the pixel circuit is an indispensable component in most self-luminous display panels.

In an existing display panel, when the image is displayed in a low-frequency, a serious smear problem exists in the image switching, affecting the display effect.

SUMMARY

The present disclosure provides a display panel and display device.

In one aspect of the present disclosure, a display panel is provided. The display panel includes a pixel circuit and a light-emitting element.

The pixel circuit includes a drive module, a reset module, and a compensation module.

A first terminal of the drive module is coupled to the light-emitting element and is configured to provide a drive current for the light-emitting element. The drive module includes a drive transistor.

The reset module is connected between a reset signal terminal and a control terminal of the drive module and is configured to provide a reset signal for the drive module.

The compensation module is connected between the control terminal of the drive module and the first terminal of the drive module and is configured to compensate a threshold voltage of the drive transistor.

The working process of the pixel circuit includes a reset stage and a compensation stage.

In the reset stage, the reset module is configured to be turned on.

In the compensation stage, the compensation module is configured to be turned on.

A partial time period of the reset stage coincides with a partial time period of the compensation stage In another aspect of the present disclosure, a display device including the display panel described above is provided.

In embodiments of the present disclosure, the pixel circuit includes the drive module, the reset module, and the compensation module, where the reset module is connected between the reset signal terminal and the control terminal of the drive module, and the compensation module is connected between the control terminal of the drive module and the first terminal of the drive module. In the reset stage, the reset module is turned on. In the compensation stage, the compensation module is turned on. A partial time period of the reset stage coincides with a partial time period of the compensation stage.

BRIEF DESCRIPTION OF DRAWINGS

To illustrate technical solutions in embodiments of the present disclosure more clearly, drawings used in description of the embodiments will be briefly described below. Apparently, the drawings described below illustrate part of the embodiments of the present disclosure, and those of ordinary skill in the art may obtain other drawings based on the drawings described below on the premise that no creative work is done.

DETAILED DESCRIPTION

The technical solutions in embodiments of the present disclosure will be described clearly and completely in conjunction with the drawings in the embodiments of the present disclosure from which the solutions of the present disclosure will be better understood by those skilled in the art. Apparently, the embodiments described below are part, not all, of the embodiments of the present disclosure. Based on the embodiments described in the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used for distinguishing between similar objects and are not necessarily used for describing a particular order or sequence. It should be understood that the data used in this manner is interchangeable in appropriate cases so that the embodiments of the present disclosure described here may also be implemented in a sequence not illustrated or described here. In addition, the terms "comprising", "including" or any other variations thereof are intended to encompass a non-exclusive inclusion. For example, a process, method, system, product or device that includes a series of steps or elements not only includes the expressly listed steps or elements but may also include other steps or elements that are not expressly listed or are inherent to such a process, method, system, product or device.

Figure 1:
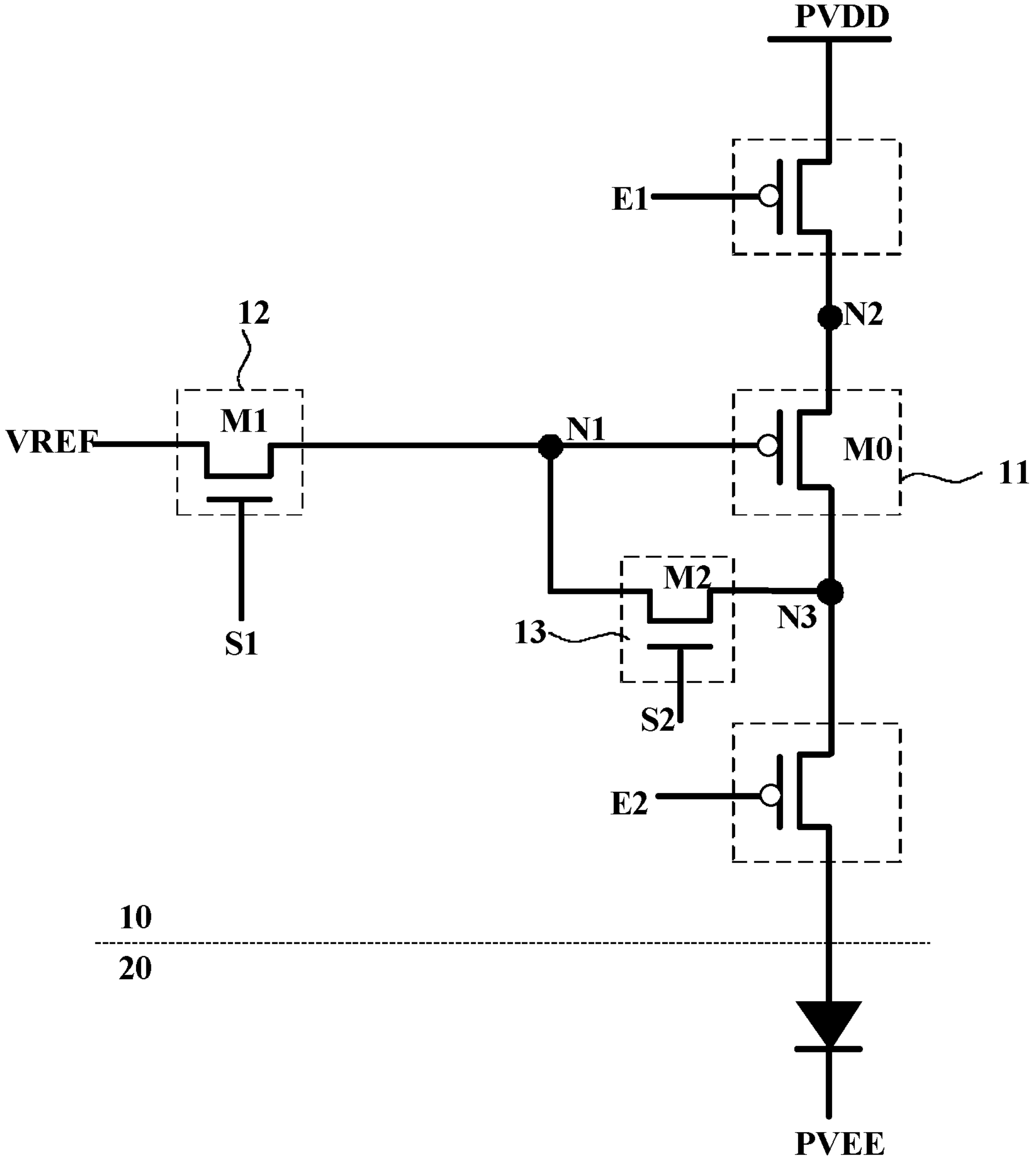
FIG. 1 is a schematic diagram of a pixel circuit according to an embodiment of the present disclosure.

FIG. 1 is a schematic diagram of a pixel circuit according to an embodiment of the present disclosure. As shown in FIG. 1, the display panel includes a pixel circuit 10 and a light-emitting element 20, where the pixel circuit 10 includes a drive module 11, a reset module 12, and a compensation module 13, where a first terminal N3 of the drive module 11 is coupled to the light-emitting element 20 and is configured to provide a drive current for the light-emitting element 20, and the drive module 11 includes a drive transistor M0; the reset module 12 is connected between a reset signal terminal VREF and a control terminal N1 of the drive module 11 and is configured to provide a reset signal for the drive module 11; and the compensation module 13 is connected between the control terminal N1 of the drive module 11 and the first terminal N3 of the drive module 11 and is configured to compensate a threshold voltage of the drive transistor M0; and a working process of the pixel circuit 10 includes a reset stage and a compensation stage; in the reset stage, the reset module 12 is configured to be turned on; in the compensation stage, the compensation module 13 is configured to be turned on; and a partial time period of the reset stage coincides with a partial time period of the compensation stage. It is to be noted that FIG. 1 illustrates only the key structures in the above embodiment and does not include all the structures operating in the pixel circuit. Other circuit structures of the pixel circuit are gradually shown in the following description of this embodiment.

In this embodiment, the pixel circuit 10 includes a drive module 11, where the drive module 11 includes a control terminal N1, a first terminal N3, and a second terminal N2. The control terminal N1 of the drive module 11 is connected to the output terminal of the reset module 12, the first terminal N3 of the drive module 11 is coupled to the light-emitting element 20, and the second terminal N2 of the drive module 11 is coupled to a first power terminal PVDD. The drive module 11 includes a drive transistor M0, where the gate of the drive transistor M0 is connected to the control terminal N1 of the drive module 11. In the case where the drive transistor M0 is a p-type transistor, the input terminal, i.e. the source of the drive transistor M0 is connected to the second terminal N2 of the drive module 11, the output terminal, i.e. the drain of the drive transistor M0 is connected to the first terminal N3 of the drive module 11, here N1 may also represent the gate of the drive transistor M0, N2 may also represent the input terminal of the drive transistor M0, and N3 may also represent the output terminal of the drive transistor M0. It is to be understood that the source and drain of the transistor is not constant but varies with the driving state of the transistor. When the control terminal N1 of the drive module 11 receives an effective pulse signal, the drive transistor M0 is turned on and the drive module 11 provides a drive current for the light-emitting element 20. When the control terminal N1 of the drive module 11 receives an ineffective pulse signal, the drive transistor M0 is turned off. As shown in FIG. 1, optionally, the drive transistor M0 is a p-type transistor, then the effective pulse signal received by the control terminal N1 of the drive module 11 is at a low voltage to make the drive transistor M0 turned on, and the ineffective pulse signal received by the control terminal N1 of the drive module 11 is at a high voltage to make the drive transistor M0 turned off.

In other embodiments, optionally, the drive transistor is an n-type transistor, the source of the drive transistor is electrically connected to the first terminal of the drive module, and the drain of the drive transistor is electrically connected to the second terminal of the drive module, then the effective pulse signal received by the control terminal of the drive module is at a high voltage to make the drive transistor turned on, and the ineffective pulse signal received by the control terminal of the drive module is at a low voltage to make the drive transistor turned off. It is to be understood that the source and drain of the transistor is not constant but varies with the driving state of the transistor.

The pixel circuit 10 includes a reset module 12, where the input terminal of the reset module 12 is connected to a reset signal terminal VREF, and the control terminal of the reset module 12 is connected to a first scan terminal S1, and the output terminal of the reset module 12 is connected to the control terminal N1 of the drive module 11. The scan signal provided by the first scan terminal S1 is a pulse signal including effective pulse and ineffective pulse. If the scan signal provided by the first scan terminal S1 is an effective pulse, the scan signal controls a transmission path between the input terminal and the output terminal of the reset module 12 to be turned on, and the reset signal provided by the reset signal terminal VREF is transmitted to the gate N1 of the drive transistor M0 to control ON/OFF of the drive transistor M0. It is to be noted that, normally, the reset signal can control the drive transistor to be turned on so that the reset signal is transmitted to the gate N1 of the drive transistor M0 to control the drive transistor M0 to be turned on. If the scan signal provided by the first scan terminal S1 is an ineffective pulse, the scan signal controls a transmission path between the input terminal and the output terminal of the reset module 12 to be turned off. Therefore, the reset module 12 is used for, in response to the scan signal of the first scan terminal S1, transmitting the reset signal provided by the reset signal terminal VREF to the gate N1 of the drive transistor M0.

The pixel circuit 10 includes a compensation module 13, where the compensation module 13 is connected between the control terminal N1 of the drive module 11 and the first terminal N3 of the drive module 11, and the control terminal of the compensation module 13 is connected to a second scan terminal S2. The scan signal provided by the second scan terminal S2 is a pulse signal including effective pulse and ineffective pulse. If the scan signal provided by the second scan terminal S2 is an effective pulse, the scan signal controls a transmission path between the control terminal N1 of the drive module 11 and the first terminal N3 of the drive module 11 to be turned on so that voltages of the control terminal N1 of the drive module 11 and the first terminal N3 of the drive module 11 can be adjusted, for example, compensating the threshold voltage of the drive transistor M0. If the scan signal provided by the second scan terminal S2 is an ineffective pulse, the scan signal controls a transmission path between the control terminal N1 of the drive module 11 and the first terminal N3 of the drive module 11 to be turned off. Therefore, the compensation module 13 is used for, in response to the scan signal of the second scan terminal S2, compensating the threshold voltage of the drive transistor M0.

The working process of the pixel circuit 10 includes a reset stage and a compensation stage. At the reset stage, the scan signal provided by the first scan terminal S1 is an effective pulse to make the reset module 12 turned on, and then the reset signal provided by the reset signal terminal VREF is transmitted through the reset module 12 to the gate N1 of the drive transistor M0 to control the drive transistor M0 to be turned on, so as to reset the gate N1 of the drive transistor M0. At the compensation stage, the scan signal provided by the second scan terminal S2 is an effective pulse to make the compensation module 13 turned on, and then a signal transmission between the control terminal N1 of the drive module 11 and the first terminal N3 of the drive module 11 is available.

In this embodiment, a partial time period of the reset stage coincides with a partial time period of the compensation stage. Therefore, in the coincidence stage of the reset stage and the compensation stage, the scan signal provided by the first scan terminal S1 is an effective pulse and the scan signal provided by the second scan terminal S2 is an effective pulse to make the reset module 12 turned on and the compensation module 13 turned on, then the reset signal provided by the reset signal terminal VREF is transmitted through the reset module 12 to the gate N1 of the drive transistor M0 to make the drive transistor M0 turned on, and the reset signal is transmitted through the compensation module 13 to the output terminal N3 of the drive transistor M0; and then the reset signal is transmitted through the drive transistor M0 to the input terminal N2 of the drive transistor M0. The reset signal resets the gate N1 of the drive transistor M0, and the reset signal resets the input terminal N2 and the output terminal N3 of the drive transistor M0 in the coincidence stage of the reset stage and the compensation stage. Then, the same voltage is applied to three terminals of the drive transistor M0 so that the bias voltage effect of different images on the drive transistor M0 can be reduced, and the drive current of the drive transistor M0 can also be refreshed.

In the embodiments of the present disclosure, the pixel circuit includes the drive module, the reset module, and the compensation module, where the reset module is connected between the reset signal terminal and the control terminal of the drive module; and the compensation module is connected between the control terminal of the drive module and the first terminal of the drive module. In the reset stage, the reset module is turned on. In the compensation stage, the compensation module is turned on. A partial time period of the reset stage coincides with a partial time period of the compensation stage. Then, the reset signal is written sequentially to the gate, the output terminal, and the input terminal of the drive transistor. In the embodiments of the present disclosure, the reset signal is written to three terminals of the drive module. That is, the same voltage is applied to three terminals of the drive transistor, reducing the bias voltage effect of different images on the drive transistor and also refreshing the drive current of the drive transistor, thereby eliminating the bias voltage effect of the previous image on the drive transistor, improving the smear problem when the image is displayed and switched in a low-frequency, and improving the display effect.

Referring to FIG. 1, optionally, the reset module 12 includes a reset transistor M1, where the gate of the reset transistor M1 is connected to the first scan terminal S1; and the reset transistor M1 is a metal oxide transistor, and the drive transistor M0 is a low-temperature poly-silicon transistor. Optionally, the compensation module 13 includes a compensation transistor M2, where the gate of the compensation transistor M2 is connected to the second scan terminal S2; and the compensation transistor M2 is a metal oxide transistor, and the drive transistor M0 is a low-temperature poly-silicon transistor. In other embodiments, optionally, the reset transistor is a low-temperature poly-silicon transistor and the drive transistor is a metal oxide transistor. Optionally, the compensation transistor is a low-temperature poly-silicon transistor and the drive transistor is a metal oxide transistor.

In this embodiment, the reset module 12 includes a reset transistor M1, where the input terminal of the reset transistor M1 is connected to the reset signal terminal VREF, the output terminal of the reset transistor M1 is connected to the gate N1 of the drive transistor M0, and the gate of the reset transistor M1 is connected to the first scan terminal S1. The reset transistor M1 is used for, in response to the scan signal of the first scan terminal S1, transmitting the reset signal to the gate N1 of the drive transistor M0. Optionally, the reset transistor M1 is a metal oxide transistor. Specifically, the metal oxide transistor may be an indium gallium zinc oxide thin-film transistor (IGZO-TFT) that is an n-type transistor and has the advantages of high electron mobility, low leakage current, and small volume. In the case where the reset transistor M1 is an n-type transistor, the scan signal provided by the first scan terminal S1 is at a high voltage and can control the reset transistor M1 to be turned on; and the scan signal provided by the first scan terminal S1 is at a low voltage and can control the reset transistor M1 to be turned off. At the reset stage, the scan signal provided by the first scan terminal S1 is at a high voltage to make the reset transistor M1 turned on, and the reset signal makes the drive transistor M0 turned on.

The compensation module 13 includes a compensation transistor M2, where the first terminal of the compensation transistor M2 is connected to the gate N1 of the drive transistor M0, the second terminal of the compensation transistor M2 is connected to the output terminal N3 of the drive transistor M0, and the gate of the compensation transistor M2 is connected to the second scan terminal S2. The compensation transistor M2 is configured to, in response to the scan signal of the second scan terminal S2, enable signals transmitted between the gate N1 of the drive transistor M0 and the output terminal N3 of the drive transistor M0. Optionally, the compensation transistor M2 is a metal oxide transistor. Specifically, the metal oxide transistor may be an IGZO-TFT. In the case where the compensation transistor M2 is an n-type transistor, the scan signal provided by the second scan terminal S2 is at a high voltage and can control the compensation transistor M2 to be turned on; and the scan signal provided by the second scan terminal S2 is at a low voltage and can control the compensation transistor M2 to be turned off. At the compensation stage, the scan signal provided by the second scan terminal S2 is at a high voltage to make the compensation transistor M2 turned on.

The drive transistor M0 is a low-temperature poly-silicon transistor. Specifically, the low-temperature poly-silicon transistor may be a low-temperature poly-silicon thin-film transistor (LTPS-TFT) that is a p-type transistor and has the advantages of high electron mobility and can improve the response speed. Based on this, the reset signal provided by the reset signal terminal VREF is at a low voltage and makes the drive transistor M0 turned on. At the coincidence stage of the reset stage and the compensation stage, the scan signal provided by the first scan terminal S1 is at a high voltage to make the reset transistor M1 turned on, the scan signal provided by the second scan terminal S2 is at a high voltage to make the compensation transistor M2 turned on, the reset signal provided by the reset signal terminal VREF is at a low voltage to make the drive transistor M0 turned on, and the reset signal is written to the gate N1, the output terminal N3, and the input terminal N2 of the drive transistor M0.

The LTPS-TFT and the IGZO-TFT are used in the pixel circuit 10, so it is possible to combine advantages of both the LTPS-TFT and the IGZO-TFT to achieve higher electron mobility, lower power consumption and higher stability.

In other embodiments, optionally, the reset transistor is a low-temperature poly-silicon transistor and the drive transistor is a metal oxide transistor; the compensation transistor is a low-temperature poly-silicon transistor and the drive transistor is a metal oxide transistor; and the drive transistor is a metal oxide transistor, then the reset signal provided by the reset signal terminal is at a high voltage, and the reset signal makes the drive transistor turned on.

Figure 2:
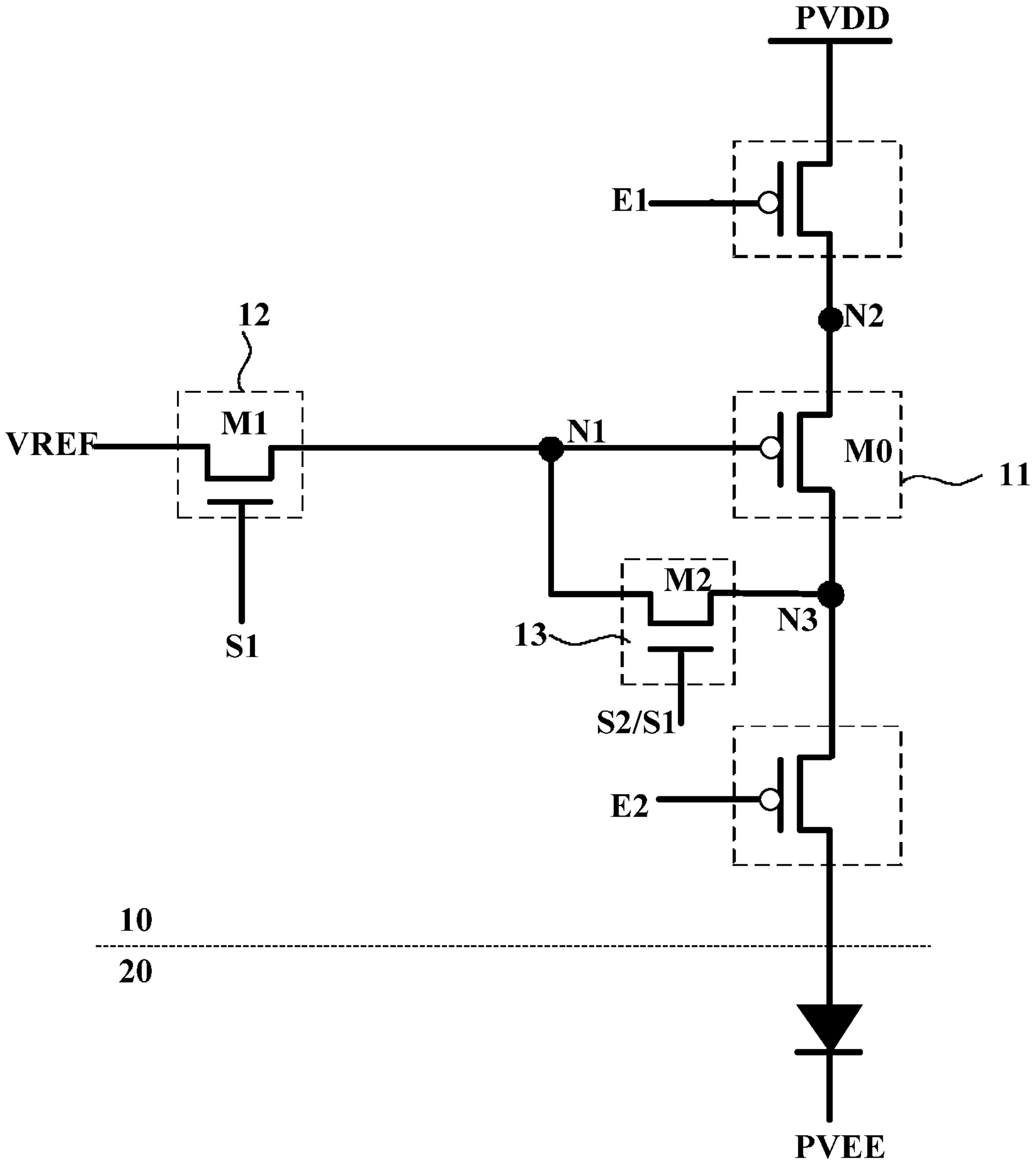
FIG. 2 is a schematic diagram of another pixel circuit according to an embodiment of the present disclosure.

FIG. 2 is a schematic diagram of another pixel circuit according to an embodiment of the present disclosure. As shown in FIG. 2, optionally, the control terminal of the reset module 12 is connected to the first scan terminal S1, and the control terminal of the compensation module 13 is connected to the second scan terminal S2. The first scan terminal S1 and the second scan terminal S2 are coupled to the same scan signal line. In this embodiment, the same scan signal line can control both ON/OFF of the reset module 12 and ON/OFF of the compensation module 13 in the pixel circuit 10 so that the number of scan signal lines in the pixel circuit 10 and corresponding driver circuits in the non-display region can be reduced, facilitating achieving the narrow bezel and the high resolution of the display panel.

Figure 3:
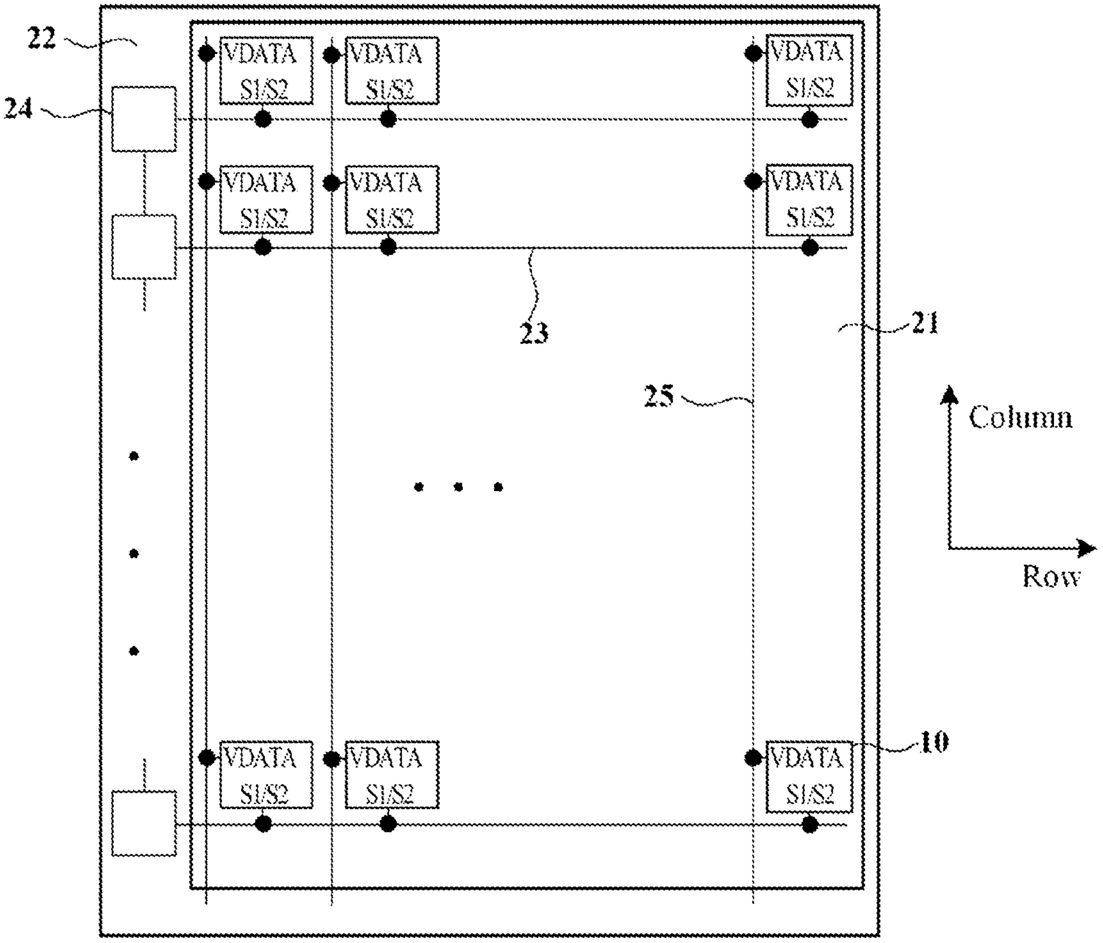
FIG. 3 is a schematic diagram of a display panel according to an embodiment of the present disclosure.

FIG. 3 is a schematic diagram of a display panel according to an embodiment of the present disclosure. As shown in FIG. 3, the display panel includes a display region 21 and a non-display region 22 disposed at the periphery of the display region 21. The display region 21 includes multiple pixel circuits 10 and multiple scan signal lines 23. Optionally, the multiple pixel circuits 10 are arranged in an array, and one scan signal line 23 connects pixel circuits 10 in one row, but the arrangement mode of the pixel circuits is not limited thereto. The non-display region 22 includes a set of cascaded shift registers 24, the output terminals of the shift registers 24 are connected to the scan signal lines 23 and provide scan signals to the scan signal lines 23. Optionally, the display panel performs progressive scanning, and the cascaded shift registers 24 provide sequentially effective pulses to the multiple scan signal lines 23 in a column direction. Optionally, as shown in the figure, the scan signal line 23 is connected to the control terminals, i.e. the first scan terminals S1 of the reset modules 12 of pixel circuits 10 in a corresponding row and is also connected to the control terminals, i.e. the second scan terminals S2 of the compensation modules 13 of pixel circuits 10 in this row so that the scan signal line 23 controls both ON/OFF of the reset modules 12 and ON/OFF of the compensation modules 13 in the pixel circuits 10.

As described above, the reset module 12 includes a reset transistor M1, the compensation module 13 includes a compensation transistor M2, and the reset transistor M1 and the compensation transistor M2 may both be IGZO-TFTs. The scan signal provided by the output terminal of the shift register 24 for the scan signal line 23 is at a high voltage, the scan signal controls the reset transistors M1 and the compensation transistors M2 in the pixel circuits 10 to be turned on at the same time, time period of the reset stage and time period of the compensation fully coincides, and the reset signal provided by the reset signal terminal VREF is written through the reset transistor M1 to the gate N1 of the drive transistor M0, then is written through the compensation transistor M2 to the output terminal N3 of the drive transistor M0, and then is written through the drive transistor M0 to the input terminal N2 of the drive transistor M0, to reset the gate N1, the output terminal N3, and the input terminal N2 of the drive transistor M0. The scan signal provided by the output terminal of the shift register 24 for the scan signal line 23 is at a low voltage, and the reset transistor M1 and the compensation transistor M2 in the pixel circuit 10 are both controlled to be turned off. In other embodiments, the reset transistor and the compensation transistor may both be the LTPS-TFTs.

In the pixel circuit 10, the first scan terminal S1 and the second scan terminal S2 are coupled to the same scan signal line 23. That is, the gate of the reset transistor M1 and the gate of the compensation transistor M2 are connected to the same scan signal line 23 so that the number of scan signal lines in the pixel circuits 10 is reduced, reducing the layout size of the pixel circuits 10 and facilitating improving the resolution of the display panel. One shift register 24 in the non-display region 22 provides the scan signal to the reset modules 12 and the compensation modules 13 in the pixel circuits 10 through one scan signal line 23, then at least one scan signal line is saved in the pixel circuits 10. Therefore, in the non-display region 22, a set of driver circuits connected to the original scan signal line and used for providing the scan signal to the scan signal line is saved. In this manner, the bezel size of the display panel can be reduced, achieving a narrow bezel of the display panel.

Figure 4:
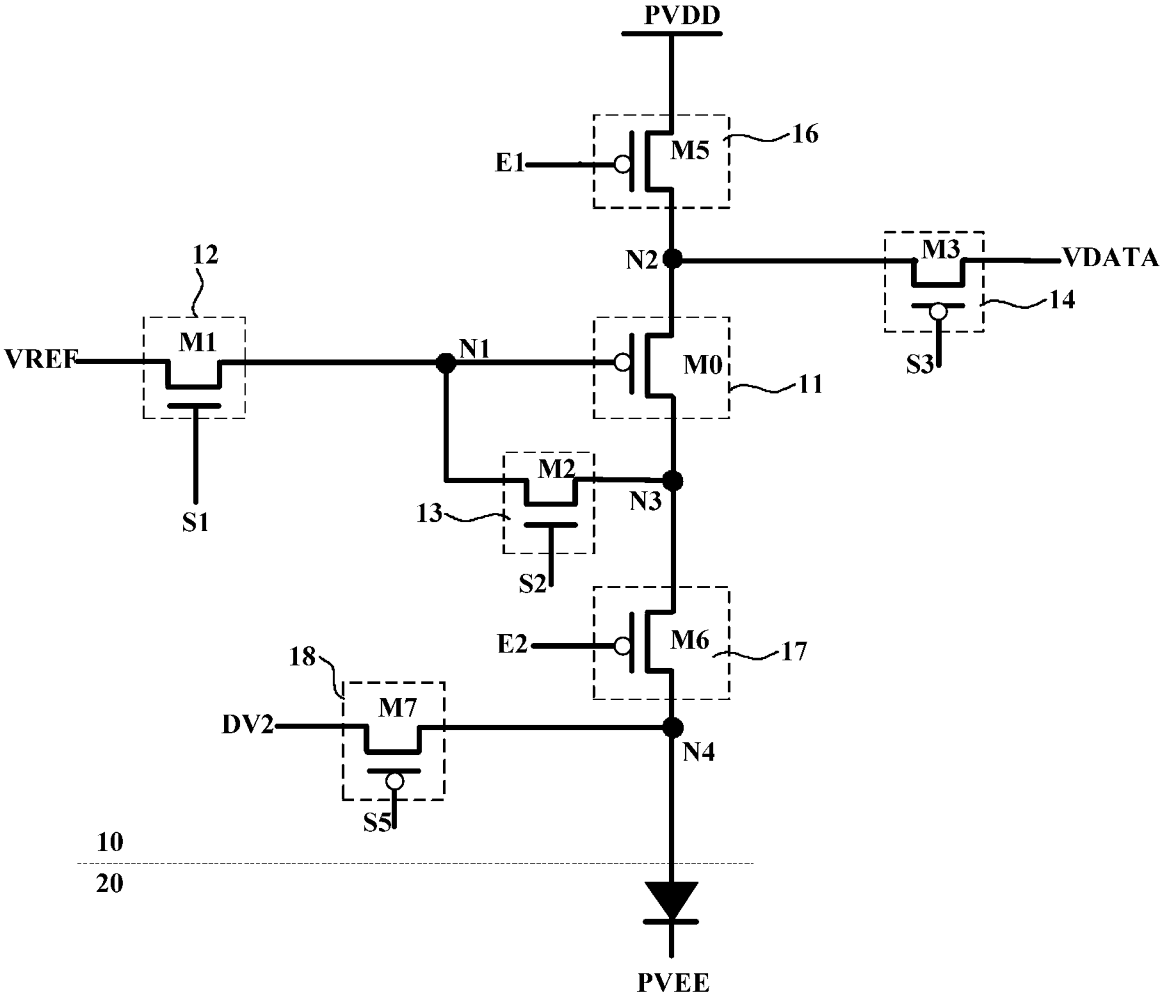
FIG. 4 is a schematic diagram of another pixel circuit according to an embodiment of the present disclosure.

FIG. 4 is a schematic diagram of another pixel circuit according to an embodiment of the present disclosure. As shown in FIG. 4, optionally, the pixel circuit also includes a first data write module 14, where the first data write module 14 is connected between a data signal terminal VDATA and the second terminal N2 of the drive module 11, and the control terminal of the first data write module 14 is connected to a third scan terminal S3. The working process of the pixel circuit 10 includes a first data write stage, where in the first data write stage, the first data write module 14 is turned on.

In this embodiment, the pixel circuit 10 includes a first data write module 14, where the input terminal of the first data write module 14 is connected to the data signal terminal VDATA, the control terminal of the first data write module 14 is connected to the third scan terminal S3, and the output terminal of the first data write module 14 is connected to the second terminal N2 of the drive module 11. The scan signal provided by the third scan terminal S3 is a pulse signal including effective pulse and ineffective pulse. If the scan signal provided by the third scan terminal S3 is an effective pulse, a transmission path between the input terminal and the output terminal of the first data write module 14 is controlled to be turned on, and the data signal provided by the data signal terminal VDATA is transmitted to the input terminal N2 of the drive transistor M0 through the first data write module 14. If the scan signal provided by the third scan terminal S3 is an ineffective pulse, a transmission path between the input terminal and the output terminal of the first data write module 14 is controlled to be turned off. Therefore, the first data write module 14 is used for, in response to the scan signal of the third scan terminal S3, transmitting the data signal provided by the data signal terminal VDATA to the input terminal N2 of the drive transistor M0.

Optionally, the first data write module 14 includes a first data write transistor M3, where the gate of the first data write transistor M3 is connected to the third scan terminal S3, the input terminal of the first data write transistor M3 is connected to the data signal terminal VDATA, and the output terminal of the first data write transistor M3 is connected to the input terminal N2 of the drive transistor M0. Optionally, the first data write transistor M3 is an LTPS-TFT. In the case where the first data write transistor M3 is a p-type transistor, the scan signal provided by the third scan terminal S3 is at a low voltage and can control the first data write transistor M3 to be turned on; and the scan signal provided by the third scan terminal S3 is at a high voltage and can control the first data write transistor M3 to be turned off. In the first data write stage, the scan signal provided by the third scan terminal S3 is at a low voltage to make the first data write transistor M3 turned on, and the data signal is written to the input terminal N2 of the drive transistor M0. In other embodiments, optionally, the first data write transistor is a metal oxide transistor.

As shown in FIG. 3, the display region 21 also includes multiple data signal lines 25, where one data signal line 25 is connected to data signal terminals VDATA of pixel circuits 10 in one column. The data signal line 25 provides data signals for pixel circuits 10 in one column in time division so that the data signal received by the data signal terminal VDATA of one pixel circuit 10 is the data signal required by the pixel circuit 10 in this row or another row.

The pixel circuits 10 in the first row are taken as an example. If the data signal line 25 provides the data signal required by the pixel circuit 10 in the first row, then the scan signal provided by the third scan terminal S3 of the pixel circuit 10 in the first row is an effective pulse so that the first data write module 14 of the pixel circuit 10 in the first row is turned on and the data signal is written to the input terminal N2 of the drive transistor M0 of the pixel circuit 10 in the first row. If the data signal line 25 provides the data signal required by the pixel circuit in another row, then the scan signal provided by the third scan terminal S3 of the pixel circuit 10 in the first row is an ineffective pulse so that the first data write module 14 of the pixel circuit 10 in the first row is turned off, and the data signal of the pixel circuit 10 in another row cannot be written to the input terminal N2 of the drive transistor M0 of the pixel circuit 10 in the first row.

Therefore, the first data write stage of the pixel circuit 10 is a stage in which the data signal of the pixel circuits 10 in this row is written. In the first data write stage, the scan signal provided by the third scan terminal S3 is an effective pulse to make the first data write module 14 turned on, and the data signal is written to the input terminal N2 of the drive transistor M0 of the pixel circuit 10 in this row.

Figure 5:
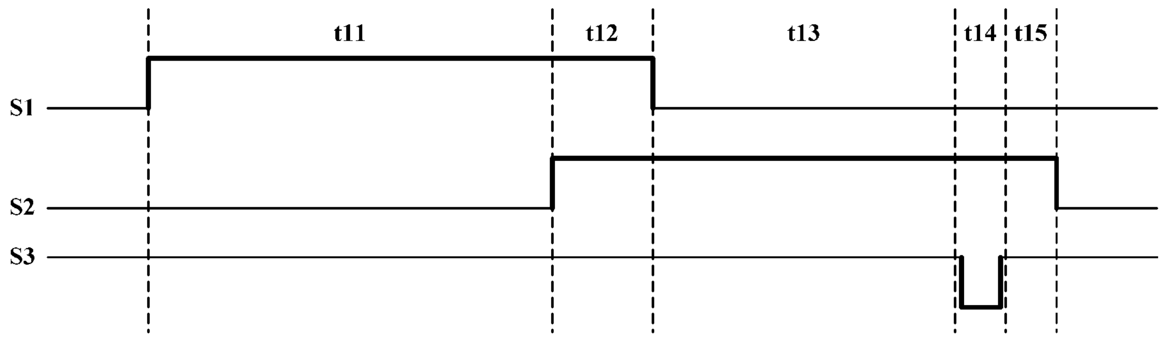
FIG. 5 is a timing diagram of the pixel circuit of FIG. 4.

Optionally, the first data write stage is disposed after the reset stage, and a partial time period of the compensation stage coincides with the first data write stage. Optionally, a start time of the reset stage is earlier than a start time of the compensation stage. FIG. 5 is a timing diagram of the pixel circuit of FIG. 4. It is to be noted that, in this embodiment, only the related timing of one row of pixel circuits 10 is described as an example. The first scan terminal S1 provides the scan signal to the control terminal of the reset module 12, the second scan terminal S2 provides the scan signal to the control terminal of the compensation module 13, and the third scan terminal S3 provides the scan signal to the control terminal of the first data write module 14. Here, both the drive transistor M0 and the first data write transistor M3 are LTPS-TFTs, and both the reset transistor M1 and the compensation transistor M2 are IGZO-TFTs. The voltage of the reset signal provided by the reset signal terminal VREF is relatively low, for example, the reset signal is −7V. The voltage of the data signal provided by the data signal terminal VDATA is relatively high, for example, the data signal is in the range of 0V~+5V.

Referring to FIGS. 4 and 5, the pixel circuit 10 includes a reset stage of t11 to t12, a compensation stage of t12 to t15, and a first data write stage t14. The coincidence time period of the reset stage of t11 to t12 and the compensation stage of t12 to t15 is t12.

In the reset stage of t11, the first scan terminal S1 provides a high voltage to make the reset transistor M1 turned on. The second scan terminal S2 provides a low voltage to make the compensation transistor M2 turned off. The third scan terminal S3 provides a high voltage to make the first data write transistor M3 turned off. Then, the reset signal provided by the reset signal terminal VREF is written to the gate N1 of the drive transistor M0 through the reset transistor M1 to make the drive transistor M0 turned on. The gate N1 of the drive transistor M0 is reset so that the bias voltage effect of the previous image can be attenuated and the smear problem can be improved.

In the reset stage t12, the reset transistor M1 keeps on. The second scan terminal S2 provides a high voltage to make the compensation transistor M2 turned on. The first data write transistor M3 keeps off. The drive transistor M0 keeps on. The reset signal is written to the gate N1 of the drive transistor M0 through the reset transistor M1, then is written to the output terminal N3 of the drive transistor M0 through the compensation transistor M2, and then is written to the input terminal N2 of the drive transistor M0 through the drive transistor M0 to reset the three terminals of the gate N1, the input terminal N2, and the output terminal N3 of the drive transistor M0. The same voltage is applied to three terminals of the drive transistor M0 so that the bias voltage effect caused by other images can be eliminated.

In the compensation stage t13, the first scan terminal S1 provides a low voltage to make the transistor M1 turned off. The compensation transistor M2 keeps on. The first data write transistor M3 keeps off. The drive transistor M0 keeps on. Thus, the voltages of three terminals of the drive transistor M0 can be stabilized, eliminating the bias voltage effect caused by other images.

In the first data write stage t14, the reset transistor M1 keeps off, and the compensation transistor M2 keeps on. The third scan terminal S3 provides a low voltage to make the first data write transistor M3 turned on. The drive transistor M0 first keeps on, the data signal provided by the data signal terminal VDATA is written to the input terminal N2 of the drive transistor M0 through the first data write transistor M3, then is written to the output terminal N3 of the drive transistor M0 through the drive transistor M0, and then is written to the gate N1 of the drive transistor M0 through the compensation transistor M2, and thus the potential of the N1 node varies until the drive transistor M0 is turned off. The data signal required by the pixel circuit 10 in this row is written to three terminals of the drive transistor M0.

In the compensation stage t15, the reset transistor M1 keeps off, the compensation transistor M2 keeps on, the first data write transistor M3 is turned off, and the drive transistor M0 keeps off. Thus, the voltages of three terminals of the drive transistor M0 can be stabilized, eliminating the bias voltage effect caused by other images.

In this embodiment, before the data signal of the pixel circuit 10 in this row is written, the voltages of three terminals of the drive transistor M0 are the same so that the bias voltage effect of the previous image can be eliminated and no matter whether the previous image is black or white, the bias voltage effect caused by the previous image can be avoided, improving the smear problem when the low-frequency displayed image is switched, and improving the display effect.

Figure 6:
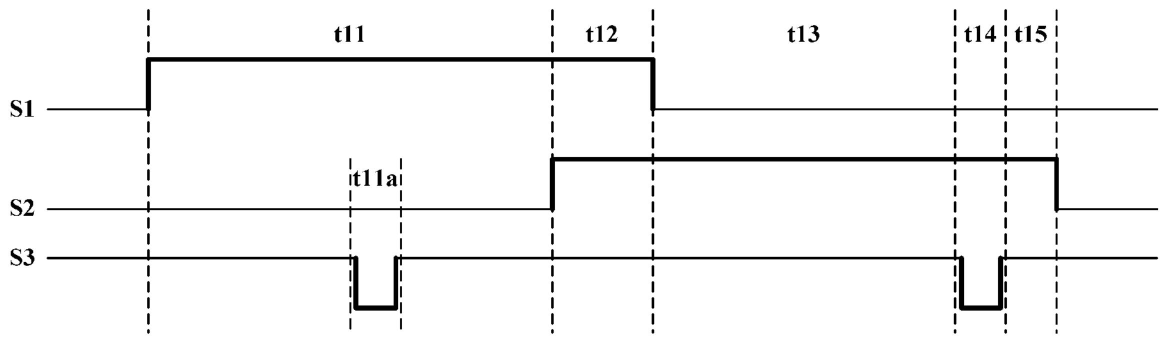
FIG. 6 is another timing diagram of the pixel circuit of FIG. 4.

Optionally, the working process of the pixel circuit includes a second data write stage, where a start time of the second data write stage is later than or equal to a start time of the reset stage, and an end time of the second data write stage is earlier than or equal to a start time of the compensation stage. FIG. 6 is another timing diagram of the pixel circuit of FIG. 4. The difference of FIG. 6 from FIG. 5 lies in that the working process of the pixel circuit 10 includes a second data write stage t11*a*. The coincidence time period of the reset stage of t11 to t12 and the second data write stage t11*a* is t11*a*. The second data write stage t11*a* does not overlap the compensation stage of t12 to t15.

In the reset stage t11, the reset transistor M1 is turned on, the compensation transistor M2 is turned off, the reset signal is written to the gate N1 of the drive transistor M0 through the reset transistor M1 to make the drive transistor M0 turned on, and the first data write transistor M3 is turned on in a partial time period of the reset stage tn. In the second data write stage t11*a*, the first data write transistor M3 is turned on, and the drive transistor M0 keeps on. In this case, the data signal provided by the data signal terminal VDATA is the data signal of the pixel circuit in another row, and then the data signal is written sequentially to the input terminal N2 and the output terminal N3 of the drive transistor M0 through the first data write transistor M3. In the case where the drive transistor M0 is a p-type transistor, the reset signal is at a low voltage and the data signal is at a high voltage so that the drive transistor M0 is negatively biased to eliminate the positive bias voltage effect of the previous image and improve the smear problem.

In this embodiment, before the data signal of this row is written, the drive transistor M0 is negatively biased once to eliminate the bias voltage effect of the previous image on the drive transistor M0.

Figure 7:
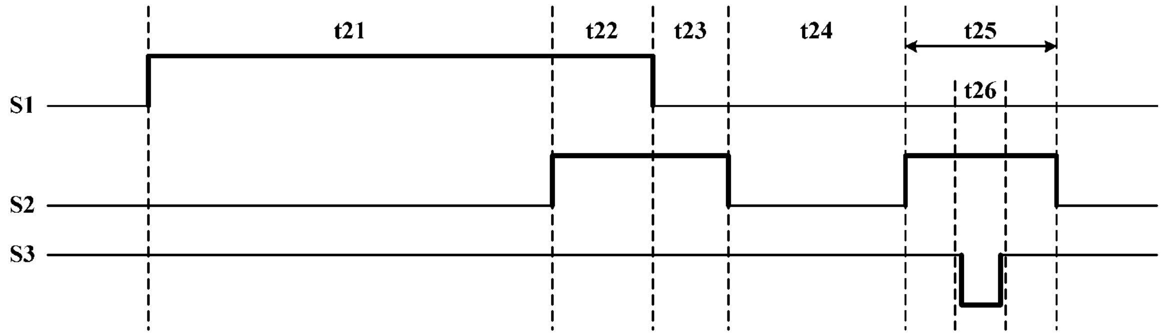
FIG. 7 is another timing diagram of the pixel circuit of FIG. 4.

Optionally, the compensation stage includes a first compensation stage and a second compensation stage disposed at intervals. A partial time period of the reset stage coincides with a partial time period of the first compensation stage, and a partial time period of the second compensation stage coincides with the first data write stage. FIG. 7 is another timing diagram of the pixel circuit of FIG. 4. Referring to FIGS. 4 and 7, the pixel circuit 10 includes a reset stage of t21 to t22, a compensation stage, and a first data write stage t26, where the compensation stage includes a first compensation stage of t22 to t23 and a second compensation stage t25 disposed at intervals. The coincidence time period of the reset stage of t21 to t22 and the first compensation stage of t22 to t23 is t22.

In this embodiment, in the reset stage t21, the reset transistor M1 is turned on, the compensation transistor M2 is turned off, the first data write transistor M3 is turned off, the drive transistor M0 is turned on, and the reset signal is written to the gate N1 of the drive transistor M0 through the reset transistor M1.

In the reset stage t22, the reset transistor M1 keeps on, the compensation transistor M2 is turned on, the first data write transistor M3 keeps off, the drive transistor M0 keeps on, and the reset signal is written to the gate N1, the input terminal N2, and the output terminal N3 of the drive transistor M0. The same voltage is applied to three terminals of the drive transistor M0, and then the bias voltage effect caused by other images can be eliminated.

In the first compensation stage t23, the reset transistor M1 is turned off, the compensation transistor M2 keeps on, the first data write transistor M3 keeps off, and the drive transistor M0 keeps on. In other embodiments, optionally, a partial time period of the reset stage is also multiplexed as the first compensation stage.

In an interval stage t24 between the first compensation stage t23 and the second compensation stage t25, the reset transistor M1 keeps off, the compensation transistor M2 is turned off, the first data write transistor M3 keeps off, and the drive transistor M0 keeps on.

In the second compensation stage t25, the reset transistor M1 keeps off, the compensation transistor M2 is turned on, and the first data write transistor M3 is turned on in a partial time period of the second compensation stage t25. In the first data write stage t26, the first data write transistor M3 is turned on, and the data signal of the pixel circuit 10 in this row is written to three terminals of the drive transistor M0, then the drive transistor M0 is switched from ON to OFF. In other embodiments, optionally, the second compensation stage is also multiplexed as the first data write stage.

As described above, before the data signal of the pixel circuit 10 in this row is written, the reset signal is written to three terminals of the drive transistor M0, that is, the same voltage is applied to three terminals of the drive transistor M0 so that the bias voltage effect of the previous image can be eliminated and no matter whether the previous image is black or white, the bias voltage effect caused by the previous image can be avoided, improving the smear problem when the low-frequency displayed image is switched, and improving the display effect.

Figure 8:
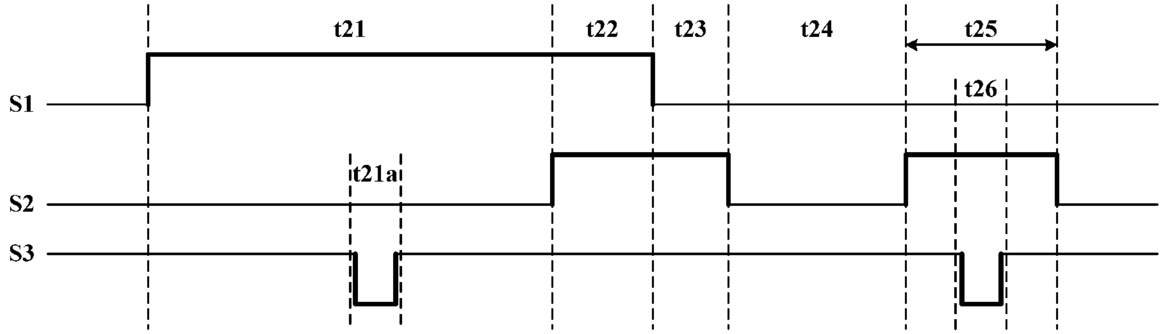
FIG. 8 is another timing diagram of the pixel circuit of FIG. 4.

Optionally, the working process of the pixel circuit includes a second data write stage, where a start time of the second data write stage is later than or equal to a start time of the reset stage, and an end time of the second data write stage is earlier than or equal to a start time of the compensation stage. FIG. 8 is another timing diagram of the pixel circuit of FIG. 4. The difference of FIG. 8 from FIG. 7 lies in that the working process of the pixel circuit 10 includes a second data write stage t21*a*. The coincidence time period of the reset stage of t21 to t22 and the second data write stage t21*a* is t21*a*. The second data write stage t21*a* does not overlap the first compensation stage of t22 to t23, and the second data write stage t21*a* does not overlap the second compensation stage t25. If the start time of the second data write stage is later than the start time of the reset stage, the time interval between the start time of the second data write stage and the start time of the reset stage is set to be at least an even number of H, such as 2H, where 2H is a reset start time difference of the pixel circuits in adjacent rows. For example, when the pixel circuit in the n-th row performs the reset stage, the pixel circuit in the (n−2)-th row performs the second data write stage, facilitating driving the pixel circuits in two rows by one scan drive unit in a one-drive-two way, and achieving the narrow bezel and high resolution of the display panel. But not limited thereto, for example, the time interval between the start time of the second data write stage and the start time of the reset stage is set to be at least an odd number of H, such as 1H, and then the pixel circuit in the n-th row performs the reset stage, the pixel circuit in the (n−1)-th row performs the second data write stage.

In the reset stage t21, the reset transistor M1 is turned on, the compensation transistor M2 is turned off, the reset signal is written to the gate N1 of the drive transistor M0 through the reset transistor M1 to make the drive transistor M0 turned on, and the first data write transistor M3 is turned on in a partial time period of the reset stage t21. In the second data write stage t21*a*, the first data write transistor M3 is turned on, and the drive transistor M0 keeps on. In this case, the data signal provided by the data signal terminal VDATA is the data signal of the pixel circuit in another row, and then the data signal is written sequentially to the input terminal N2 and the output terminal N3 of the drive transistor M0 through the first data write transistor M3. In the case where the drive transistor M0 is a p-type transistor, the reset signal is at a low voltage and the data signal is at a high voltage so that the drive transistor M0 is negatively biased to eliminate the positive bias voltage effect of the previous image and improve the smear problem.

In this embodiment, before the data signal in this row is written, the drive transistor M0 is negatively biased once to eliminate the bias voltage effect of the previous image on the drive transistor M0.

Figure 9:
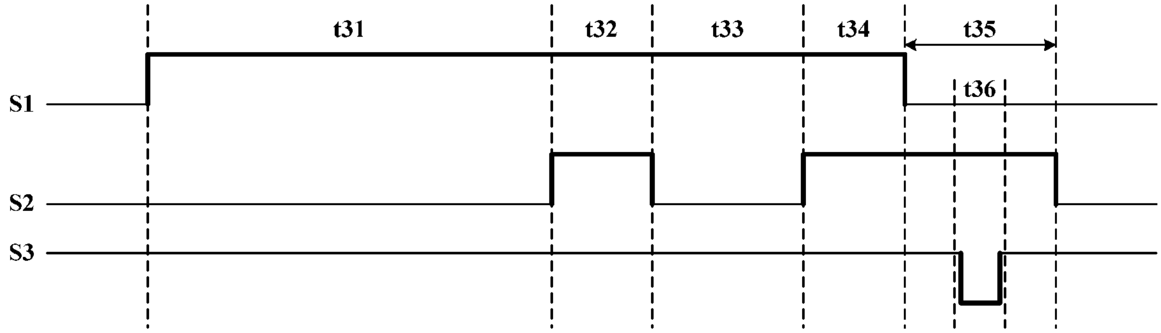
FIG. 9 is another timing diagram of the pixel circuit of FIG. 4.

Optionally, a partial time period of the reset stage also coincides with a partial time period of the second compensation stage. FIG. 9 is another timing diagram of the pixel circuit of FIG. 4. Referring to FIGS. 4 and 9, the pixel circuit 10 includes a reset stage of t31 to t34, a compensation stage and a first data write stage t36, where the compensation stage includes a first compensation stage t32 and a second compensation stage t34 to t35 disposed at intervals. The coincidence time period of the reset stage of t31 to t34 and the first compensation stage t32 is t32, and the coincidence time period of the reset stage of t31 to t34 and the second compensation stage of t34 to t35 is t34.

In this embodiment, in the reset stage t31, the reset transistor M1 is turned on, the compensation transistor M2 is turned off, the first data write transistor M3 is turned off, the drive transistor M0 is turned on, and the reset signal is written to the gate N1 of the drive transistor M0 through the reset transistor M1.

In the reset stage t32, the reset transistor M1 keeps on, the compensation transistor M2 is turned on, the first data write transistor M3 keeps off, the drive transistor M0 keeps on, and the reset signal is written to the gate N1, the input terminal N2, and the output terminal N3 of the drive transistor M0. The same voltage is applied to three terminals of the drive transistor M0, and then the bias voltage effect caused by other images can be eliminated.

In the reset stage t33, the reset transistor M1 keeps on, the compensation transistor M2 is turned off, the first data write transistor M3 keeps off, the drive transistor M0 keeps on, and the reset signal is written to the gate N1 of the drive transistor M0 through the reset transistor M1.

In the reset stage t34, the reset transistor M1 keeps on, the compensation transistor M2 is turned on, the first data write transistor M3 keeps off, the drive transistor M0 keeps on, and the reset signal is written to the gate N1, the input terminal N2, and the output terminal N3 of the drive transistor M0, achieving a second reset of three terminals of the drive transistor M0.

In the second compensation stage t35, the reset transistor M1 is turned off, the compensation transistor M2 keeps on, and the first data write transistor M3 is turned on in a partial time period of the second compensation stage t35. In the first data write stage t36, the first data write transistor M3 is turned on, and the data signal of the pixel circuit in this row is written to the drive transistor M0, then the drive transistor M0 is switched from ON to OFF.

As described above, before the data signal of the pixel circuit 10 in this row is written, three terminals of the drive transistor M0 are reset twice so that the bias voltage effect caused by different display images can be avoided, improving the smear problem when the low-frequency displayed image is switched, and improving the display effect.

Figure 10:
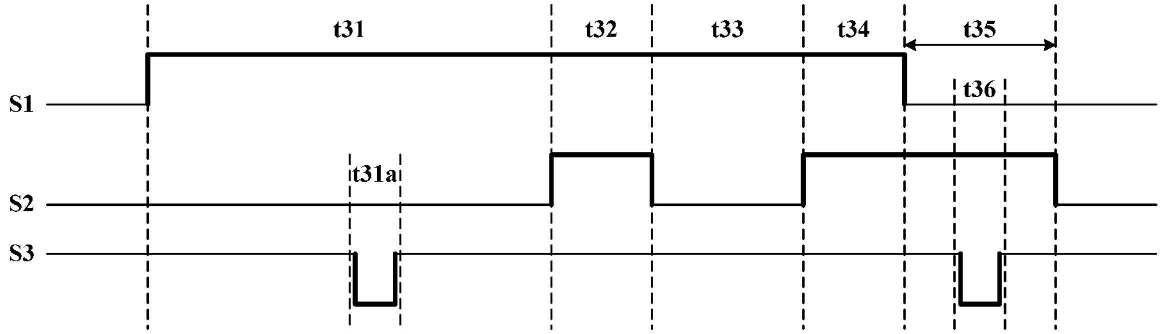
FIG. 10 is another timing diagram of the pixel circuit of FIG. 4.

Optionally, the working process of the pixel circuit includes a second data write stage, where a start time of the second data write stage is later than or equal to a start time of the reset stage, and an end time of the second data write stage is earlier than or equal to a start time of the compensation stage. FIG. 10 is another timing diagram of the pixel circuit of FIG. 4. The difference of FIG. 10 from FIG. 9 lies in that the working process of the pixel circuit 10 includes a second data write stage t31*a*. The coincidence time period of the reset stage of t31 to t34 and the second data write stage t31*a* is t31*a*, the second data write stage t31*a* does not overlap the first compensation stage t32, and the second data write stage t31*a* does not overlap the second compensation stage of t34 to t35.

In the reset stage t31, the reset transistor M1 is turned on, the compensation transistor M2 is turned off, the reset signal is written to the gate N1 of the drive transistor M0 through the reset transistor M1 to make the drive transistor M0 turned on, and the first data write transistor M3 is turned on in a partial time period of the reset stage t31. In the second data write stage t31*a*, the first data write transistor M3 is turned on, and the drive transistor M0 keeps on. In this case, the data signal provided by the data signal terminal VDATA is the data signal of the pixel circuit in another row, and then the data signal is written sequentially to the input terminal N2 and the output terminal N3 of the drive transistor M0 through the first data write transistor M3. In the case where the drive transistor M0 is a p-type transistor, the reset signal is at a low voltage and the data signal is at a high voltage so that the drive transistor M0 is negatively biased to eliminate the positive bias voltage effect of the previous image and improve the smear problem.

In this embodiment, before the data signal in this row is written, the drive transistor M0 is reset twice to eliminate the bias voltage effect of the previous image on the drive transistor M0.

Figure 11:
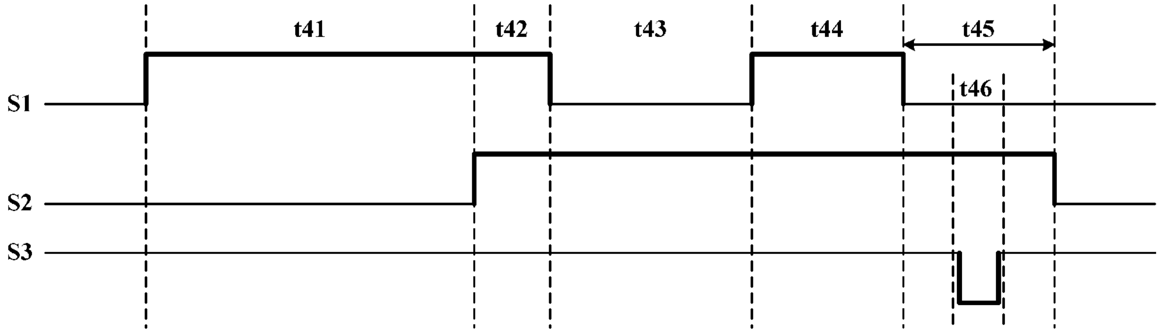
FIG. 11 is another timing diagram of the pixel circuit of FIG. 4.

Optionally, the reset stage includes a first reset stage and a second reset stage disposed at intervals. A partial time period of the first reset stage coincides with a partial time period of the compensation stage. A partial time period of the compensation stage is also multiplexed as the second reset stage. FIG. 11 is another timing diagram of the pixel circuit of FIG. 4. Referring to FIGS. 4 and 11, the pixel circuit 10 includes a reset stage, a compensation stage of t42 to t45, and a first data write stage t46, where the reset stage includes a first reset stage of t41 to t42 and a second reset stage t44 disposed at intervals. The coincidence time period of the first reset stage of t41 to t42 and the compensation stage of t42 to t45 is t42. The coincidence time period of the second reset stage t44 and the compensation stage of t42 to t45 is t44.

In this embodiment, in the first reset stage t41, the reset transistor M1 is turned on, the compensation transistor M2 is turned off, the first data write transistor M3 is turned off, the drive transistor M0 is turned on, and the reset signal is written to the gate N1 of the drive transistor M0 through the reset transistor M1.

In the first reset stage t42, the reset transistor M1 keeps on, the compensation transistor M2 is turned on, the first data write transistor M3 keeps off, the drive transistor M0 keeps on, and the reset signal is written to the gate N1, the input terminal N2, and the output terminal N3 of the drive transistor M0. The same voltage is applied to three terminals of the drive transistor M0, and then the bias voltage effect caused by other images can be eliminated.

In the interval stage t43 between the first reset stage t42 and the second reset stage t44, the reset transistor M1 is turned off, the compensation transistor M2 keeps on, and the first data write transistor M3 keeps off, and the drive transistor M0 keeps on.

In the second reset stage t44, the reset transistor M1 is turned on, the compensation transistor M2 keeps on, the first data write transistor M3 keeps off, the drive transistor M0 keeps on, and the reset signal is written to the gate N1, the input terminal N2, and the output terminal N3 of the drive transistor M0, achieving a second reset of three terminals of the drive transistor M0.

In the compensation stage t45, the reset transistor M1 is turned off, the compensation transistor M2 keeps on, and the first data write transistor M3 is turned on in a partial time period of the compensation stage t45. In the first data write stage t46, the first data write transistor M3 is turned on, and the data signal of the pixel circuit 10 in this row is written to three terminals of the drive transistor M0, then the drive transistor M0 is switched from ON to OFF.

As described above, before the data signal of the pixel circuit 10 in this row is written, three terminals of the drive transistor M0 are reset twice so that the bias voltage effect caused by different display images can be avoided, improving the smear problem when the low-frequency displayed image is switched, and improving the display effect.

Figure 12:
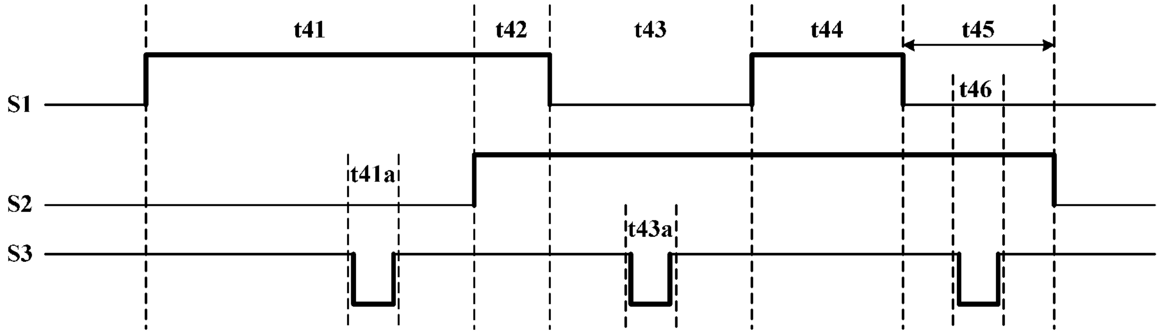
FIG. 12 is another timing diagram of the pixel circuit of FIG. 4.

Optionally, the working process of the pixel circuit includes a second data write stage, where a start time of the second data write stage is later than or equal to a start time of the reset stage, and an end time of the second data write stage is earlier than or equal to a start time of the compensation stage. Optionally, the working process of the pixel circuit includes a third data write stage, where the third data write stage is located between the first reset stage and the second reset stage and a partial time period of the compensation stage is multiplexed as the third data write stage. FIG. 12 is another timing diagram of the pixel circuit of FIG. 4, The difference of FIG. 12 from FIG. 11 lies in that the working process of the pixel circuit 10 includes a second data write stage t41*a*. The coincidence time period of the first reset stage of t41 to t42 and the second data write stage t41*a* is t41*a*, and the second data write stage t41*a* does not overlap the compensation stage of t42 to t45. The working process of the pixel circuit 10 includes a third data write stage t43*a*, and the coincidence time period of the compensation stage of t42 to t45 and the third data write stage t43*a* is t43*a*.

In the first reset stage t41, the reset transistor M1 is turned on, the compensation transistor M2 is turned off, the reset signal is written to the gate N1 of the drive transistor M0 through the reset transistor M1 to make the drive transistor M0 turned on, and the first data write transistor M3 is turned on in a partial time period of the first reset stage t41. In the second data write stage t41*a*, the first data write transistor M3 is turned on, and the drive transistor M0 keeps on. In this case, the data signal provided by the data signal terminal VDATA is the data signal of the pixel circuit in another row, and then the data signal is written sequentially to the input terminal N2 and the output terminal N3 of the drive transistor M0 through the first data write transistor M3. In the case where the drive transistor M0 is a p-type transistor, the reset signal is at a low voltage and the data signal is at a high voltage so that the drive transistor M0 is negatively biased to eliminate the positive bias voltage effect of the previous image and improve the smear problem.

In the third data write stage t43*a*, the reset transistor M1 is turned off, the compensation transistor M2 is turned on, the drive transistor M0 keeps on, and the first data write transistor M3 is turned on. In this case, the data signal provided by the data signal terminal VDATA is the data signal of the pixel circuit 10 in this row, then the data signal is written sequentially to the input terminal N2, the output terminal N3 and the gate N1 of the drive transistor M0 through the first data write transistor M3 and the compensation transistor M2, and the drive transistor M0 is switched from ON to OFF. The effect data signal write operation of the current image is applied to the drive transistor M0 once to further reduce the effect of the previous image. The drive transistor M0 is positively biased once to eliminate the bias voltage effect of the previous image on the drive transistor M0.

In this embodiment, before the data signal in this row is written, the drive transistor M0 is reset multiple times and performed data writing at least once to eliminate the bias voltage effect of the previous image on the drive transistor M0.

Figure 13:
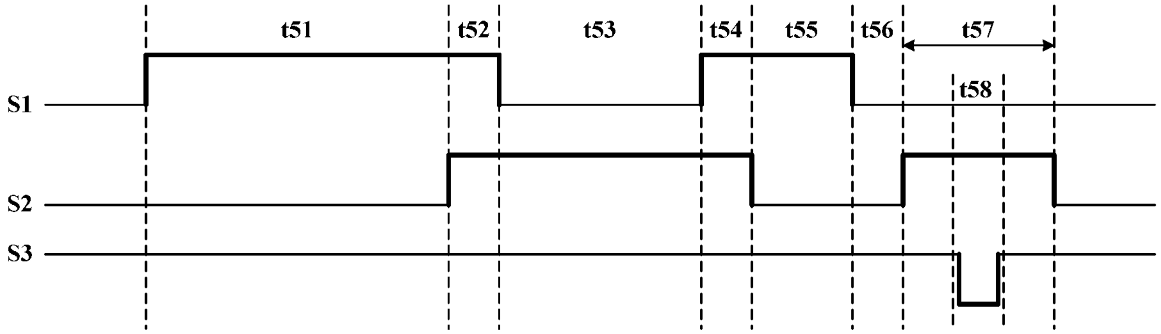
FIG. 13 is another timing diagram of the pixel circuit of FIG. 4.

Optionally, the reset stage includes a first reset stage and a second reset stage disposed at intervals. A partial time period of the first reset stage coincides with a partial time period of the first compensation stage. A partial time period of the second reset stage coincides with a partial time period of the first compensation stage. FIG. 13 is another timing diagram of the pixel circuit of FIG. 4. Referring to FIGS. 4 and 13, the pixel circuit 10 includes a reset stage, a compensation stage, and a first data write stage t58, where the reset stage includes a first reset stage of t51 to t52 and a second reset stage of t54 to t55 disposed at intervals, and the compensation stage includes a first compensation stage of t52 to t54 and a second compensation stage t57 disposed at intervals. The coincidence time period of the first reset stage of t51 to t52 and the first compensation stage of t52 to t54 is t52, and the coincidence time period of the second reset stage of t54 to t55 and the first compensation stage of t52 to t54 is t54.

In this embodiment, in the first reset stage t51, the reset transistor M1 is turned on, the compensation transistor M2 is turned off, the first data write transistor M3 is turned off, the drive transistor M0 is turned on, and the reset signal is written to the gate N1 of the drive transistor M0 through the reset transistor M1.

In the first reset stage t52, the reset transistor M1 keeps on, the compensation transistor M2 is turned on, the first data write transistor M3 keeps off, the drive transistor M0 keeps on, and the reset signal is written to the gate N1, the input terminal N2, and the output terminal N3 of the drive transistor M0. The same voltage is applied to three terminals of the drive transistor M0, and then the bias voltage effect caused by another image can be eliminated.

In the interval stage t53 between the first reset stage t52 and the second reset stage t54, the reset transistor M1 is turned off, the compensation transistor M2 keeps on, the first data write transistor M3 keeps off, and the drive transistor M0 keeps on.

In the second reset stage t54, the reset transistor M1 is turned on, the compensation transistor M2 keeps on, the first data write transistor M3 keeps off, the drive transistor M0 keeps on, and the reset signal is written to the gate N1, the input terminal N2, and the output terminal N3 of the drive transistor M0, achieving a second reset of three terminals of the drive transistor M0.

In the second reset stage t55, the reset transistor M1 keeps on, the compensation transistor M2 is turned off, the first data write transistor M3 keeps off, the drive transistor M0 keeps on, and the reset signal is written to the gate N1 of the drive transistor M0.

In the interval stage t56 between the second reset stage t55 and the second compensation stage t57, the reset transistor M1 is turned off, the compensation transistor M2 keeps off, the first data write transistor M3 keeps off, and the drive transistor M0 keeps on.

In the second compensation stage t57, the reset transistor M1 keeps off, the compensation transistor M2 is turned on, and the first data write transistor M3 is turned on in a partial time period of the second compensation stage t57. In the first data write stage t58, the first data write transistor M3 is turned on, and the data signal of the pixel circuit 10 in this row is written to three terminals of the drive transistor M0, then the drive transistor M0 is switched from ON to OFF. In other embodiments, optionally, the second compensation stage is also multiplexed as the first data write stage.

As described above, before the data signal of the pixel circuit 10 in this row is written, three terminals of the drive transistor M0 are reset twice so that the bias voltage effect caused by different display images can be avoided, improving the smear problem when the low-frequency displayed image is switched, and improving the display effect.

Figure 14:
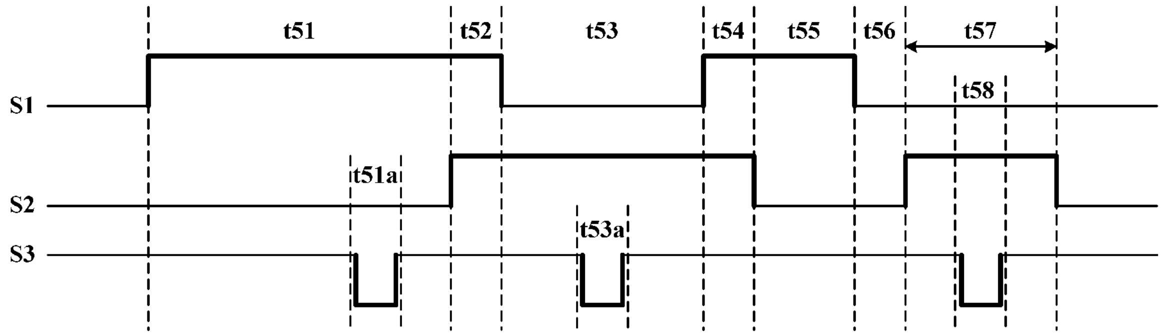
FIG. 14 is another timing diagram of the pixel circuit of FIG. 4.

Optionally, the working process of the pixel circuit includes a second data write stage, where a start time of the second data write stage is later than or equal to a start time of the reset stage, and an end time of the second data write stage is earlier than or equal to a start time of the compensation stage. Optionally, the working process of the pixel circuit includes a third data write stage, where the third data write stage is located between the first reset stage and the second reset stage and a partial time period of the compensation stage is multiplexed as the third data write stage. FIG. 14 is another timing diagram of the pixel circuit of FIG. 4. The difference of FIG. 14 from FIG. 13 lies in that the working process of the pixel circuit 10 includes a second data write stage t51*a*, where the coincidence time period of the first reset stage of t51 to t52 and the second data write stage t51*a* is t51*a*, and the second data write stage t51*a* does not overlap the first compensation stage of t52 to t54. The working process of the pixel circuit 10 includes a third data write stage t53*a*, where the coincidence time period of the first compensation stage of t52 to t54 and the third data write stage t53*a* is t53*a*.

In the first reset stage t51, the reset transistor M1 is turned on, the compensation transistor M2 is turned off, the reset signal is written to the gate N1 of the drive transistor M0 through the reset transistor M1 to make the drive transistor M0 turned on, and the first data write transistor M3 is turned on in a partial time period of the first reset stage t51. In the second data write stage t51*a*, the first data write transistor M3 is turned on, and the drive transistor M0 keeps on. In this case, the data signal provided by the data signal terminal VDATA is the data signal of the pixel circuit in another row, and then the data signal is written sequentially to the input terminal N2 and the output terminal N3 of the drive transistor M0 through the first data write transistor M3. In the case where the drive transistor M0 is a p-type transistor, the reset signal is at a low voltage and the data signal is at a high voltage so that the drive transistor M0 is negatively biased to eliminate the positive bias voltage effect of the previous image and improve the smear problem.

In the third data write stage t53*a*, the reset transistor M1 is turned off, the compensation transistor M2 is turned on, the drive transistor M0 keeps on, and the first data write transistor M3 is turned on. In this case, the data signal provided by the data signal terminal VDATA is the data signal of the pixel circuit 10 in this row, then the data signal is written sequentially to the input terminal N2, the output terminal N3 and the gate N1 of the drive transistor M0 through the first data write transistor M3 and the compensation transistor M2, and the drive transistor M0 is switched from ON to OFF. The effect data signal write operation of the current image is applied to the drive transistor M0 once to further reduce the effect of the previous image. The drive transistor M0 is positively biased once to eliminate the bias voltage effect of the previous image on the drive transistor M0.

In this embodiment, before the data signal in this row is written, the drive transistor M0 is reset multiple times and performed data writing at least once to eliminate the bias voltage effect of the previous image on the drive transistor M0.

Optionally, the pixel circuit also includes a second data write module connected between a second terminal of the drive module and a first signal terminal, where a control terminal of the second data write module is connected to a fourth scan terminal, and at the first data write stage, the second data write module is turned off. Optionally, the first data write module includes a first data write transistor, where the gate of the first data write transistor is connected to the third scan terminal. Optionally, the second data write module includes a second data write transistor, where the gate of the second data write transistor is connected to the fourth scan terminal. Optionally, the reset signal terminal provides a low-voltage signal and the first signal terminal provides a high-voltage signal.

Figure 15:
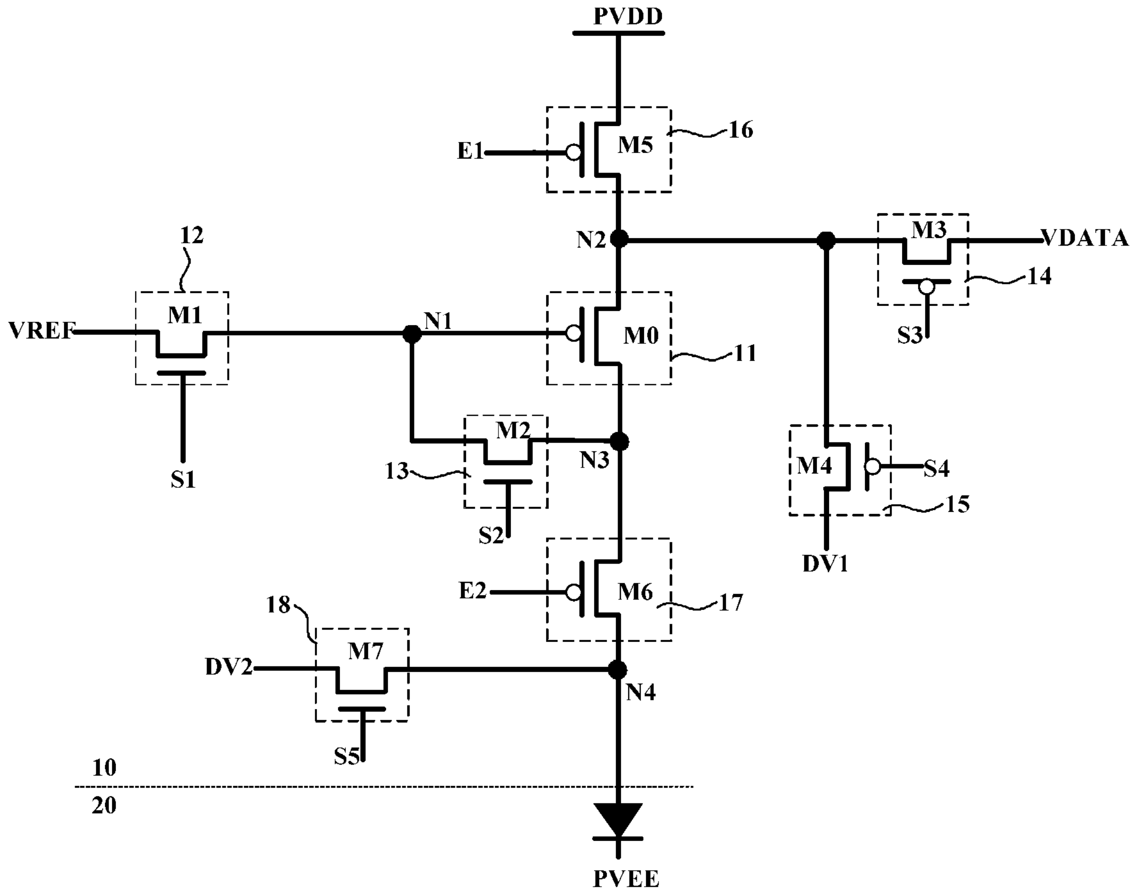
FIG. 15 is a schematic diagram of another pixel circuit according to an embodiment of the present disclosure.

FIG. 15 is a schematic diagram of another pixel circuit according to an embodiment of the present disclosure. As shown in FIG. 15, the pixel circuit 10 also includes a second data write module 15, where the input terminal of the second data write module 15 is connected to the first signal terminal DV1, the control terminal of the second data write module 15 is connected to the fourth scan terminal S4, and the output terminal of the second data write module 15 is connected to the second terminal N2 of the drive module 11. In the first data write stage, the data signal of the pixel circuit 10 in this row needs to be written to the drive transistor M0. Therefore, the third scan terminal S3 controls the first data write module 14 to be turned on, and the fourth scan terminal S4 controls the second data write module 15 to be turned off so that the second data write module 15 does not affect the normal writing of the data signal of the pixel circuit in this row.

In the case where the drive transistor M0 is a p-type transistor, before the first data write stage, a negative bias voltage is applied to the drive transistor M0 so that the positive bias voltage effect of the previous image can be eliminated. Based on this, optionally, the reset signal terminal provides a low-voltage signal and the first signal terminal DV1 provides a high-voltage signal. Here, the first data write module 14 includes a first data write transistor M3. The second data write module 15 includes a second data write transistor M4, where the gate of the second data write transistor M4 is connected to the fourth scan terminal S4, the input terminal of the second data write transistor M4 is connected to the first signal terminal DV1, and the output terminal of the second data write transistor M4 is connected to the second terminal N2 of the drive module 11. Optionally, both the first data write transistor M3 and the second data write transistor M4 are low-temperature poly-silicon transistors (LTPS-TFTs). Optionally, in other embodiments, the second data write transistor is an n-type transistor.

Both the output terminal of the first data write transistor M3 and the output terminal of the second data write transistor M4 are connected to the second terminal N2 of the drive module 11, the first signal terminal DV1 provides a high-voltage signal, and the data signal terminal VDATA provides the data signal for the pixel circuit 10 in this row or the data signal for the pixel circuit in another row. The working stage of the first data write transistor M3 and the working stage of the second data write transistor M4 do not overlap, ensuing the normal writing of the data signal or the signal of the first signal terminal DV1. In the first data write stage, the scan signal provided by the third scan terminal S3 is a low voltage, and the scan signal provided by the fourth scan terminal S4 is a high voltage so that the first data write transistor M3 is turned on, the second data write transistor M4 is turned off, and the data signal is written to the input terminal N2 of the drive transistor M0.

Optionally, the working process of the pixel circuit includes a second data write stage, where a start time of the second data write stage is later than or equal to a start time of the reset stage, and an end time of the second data write stage is earlier than or equal to a start time of the compensation stage. Optionally, the working process of the pixel circuit includes a third data write stage, where the third data write stage is located between the first reset stage and the second reset stage and a partial time period of the compensation stage is multiplexed as the third data write stage.

In this embodiment, the working process of the pixel circuit 10 includes a second data write stage and a third data write stage. In any one of the second data write stage and the third data write stage, the second data write transistor M4 is turned on, the first data write transistor M3 is turned off, and the high voltage signal provided by the first signal terminal DV1 is written to the input terminal N2 and the output terminal N3 of the drive transistor M0, thereby the drive transistor M0 is negatively biased. In other embodiments, optionally, the working process of the pixel circuit also includes a second data write stage or a third data write stage.

Figure 16:
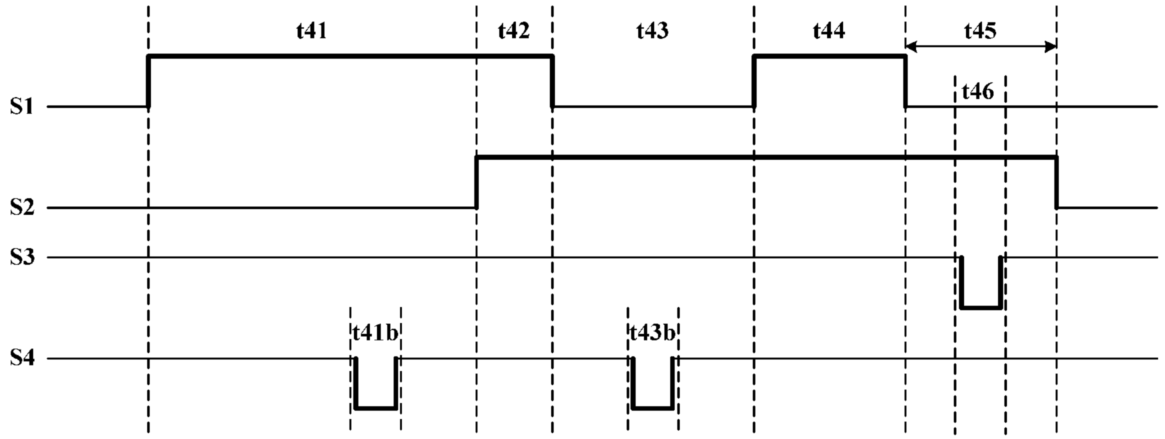
FIG. 16 is a timing diagram of the pixel circuit of FIG. 15.

FIG. 16 is a timing diagram of the pixel circuit of FIG. 15. The first scan terminal S1 provides the scan signal to the control terminal of the reset module 12, the second scan terminal S2 provides the scan signal to the control terminal of the compensation module 13, the third scan terminal S3 provides the scan signal to the control terminal of the first data write module 14, and the fourth scan terminal S4 provides the scan signal to the control terminal of the second data write module 15. Here, the drive transistor M0, both the first data write transistor M3 and the second data write transistor M4 are LTPS-TFTs, and both the reset transistor M1 and the compensation transistor M2 are IGZO-TFTs. The voltage of the reset signal provided by the reset signal terminal VREF is relatively low, for example the reset signal is −7V. The voltage of the data signal provided by the data signal terminal VDATA is relatively high, for example, the data signal ranges from 0V to +5V. The first signal terminal DV1 provides a fixed high-voltage signal, for example, the high-voltage signal is +5V.

As shown in FIG. 16, the second data write stage t41*b* overlaps the first reset stage of t41 to t42, and the third data write stage t43*b* overlaps the compensation stage of t42 to t45.

In the second data write stage t41*b*, the reset transistor M1 is turned on, the compensation transistor M2 is turned off, the first data write transistor M3 is turned off, the second data write transistor M4 is turned on, the drive transistor M0 is turned on, the reset signal is written to the gate N1 of the drive transistor M0, and the high-voltage signal provided by the first signal terminal DV1 is written sequentially to the input terminal N2 and the output terminal N3 of the drive transistor M0 through the second data write transistor M4. Thus, a negative bias voltage is applied to the drive transistor M0 to eliminate the positive bias voltage effect of the previous image and improve the smear problem.

In the third data write stage t43*b*, the reset transistor M1 is turned off, the compensation transistor M2 is turned on, the first data write transistor M3 is turned off, the second data write transistor M4 is turned on, the drive transistor M0 is turned on, the high-voltage signal provided by the first signal terminal DV1 is written sequentially to the input terminal N2, the output terminal N3, and the gate N1 of the drive transistor M0 through the second data write transistor M4, and then the drive transistor M0 is switched from ON to OFF. Thus, before the data signal in this row is written, the same voltage is applied to three terminals of the drive transistor M0 to eliminate the positive bias voltage effect of the previous image and improve the smear problem.

Figure 17:
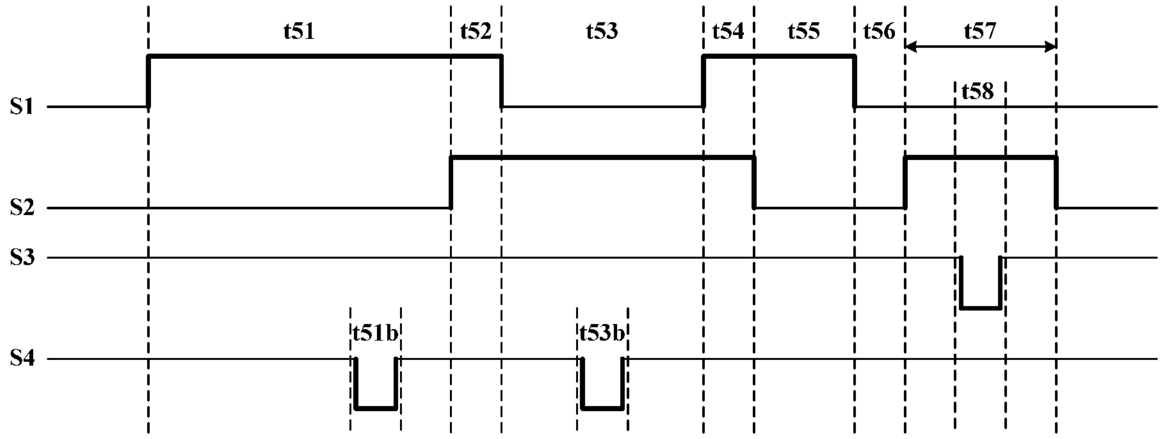
FIG. 17 is another timing diagram of the pixel circuit of FIG. 15.

FIG. 17 is another timing diagram of the pixel circuit of FIG. 15. As shown in FIG. 17, the second data write stage t51*b* overlaps the first reset stage of t51 to t42, and the third data write stage t53*b* overlaps the first compensation stage of t52 to t54.

In the second data write stage t51*b*, the reset transistor M1 is turned on, the compensation transistor M2 is turned off, the first data write transistor M3 is turned off, the second data write transistor M4 is turned on, the drive transistor M0 is turned on, the reset signal at an low voltage is written to the gate N1 of the drive transistor M0, and the high-voltage signal provided by the first signal terminal DV1 is written sequentially to the input terminal N2 and the output terminal N3 of the drive transistor M0 through the second data write transistor M4. Thus, a negative bias voltage is applied to the drive transistor M0 to eliminate the positive bias voltage effect of the previous image and improve the smear problem.

In the third data write stage t53*b*, the reset transistor M1 is turned off, the compensation transistor M2 is turned on, the first data write transistor M3 is turned off, the second data write transistor M4 is turned on, the drive transistor M0 is turned on, the high-voltage signal provided by the first signal terminal DV1 is written sequentially to the input terminal N2, the output terminal N3, and the gate N1 of the drive transistor M0 through the second data write transistor M4, and then the drive transistor M0 is switched from ON to OFF. Thus, before the data signal in this row is written, the same voltage is applied to three terminals of the drive transistor M0 to eliminate the positive bias voltage effect of the previous image and improve the smear problem.

In this embodiment, before the data signal is written to the pixel circuit 10 in this row, at least two low-voltage resets and at least two high-voltage writings are performed on three terminals of the drive transistor M0 so that the bias voltage effect caused by different display images can be avoided, improving the smear problem when the low-frequency displayed image is switched, and improving the display effect.

As shown in FIGS. 4 and 15, optionally, the pixel circuit 10 also includes a first light-emitting control module 16 and a second light-emitting control module 17, where the first light-emitting control module 16 is connected between the first power terminal PVDD and the second terminal N2 of the drive module 11, and the control terminal of the first light-emitting control module 16 is connected to the first light-emitting control terminal E1, the second light-emitting control module 17 is connected between the first terminal N3 of the drive module 11 and the light-emitting element 20, and the control terminal of the second light-emitting control module 17 is connected to the second light-emitting control terminal E2. Optionally, the first light-emitting control module 16 includes a first light-emitting transistor M5, and the second light-emitting control module 17 includes a second light-emitting transistor M6. The first light-emitting control terminal E1 provides a first light-emitting control signal to control ON/OFF of the first light-emitting transistor M5. The second light-emitting control terminal E2 provides the second light-emitting control signal to control ON/OFF of the second light-emitting transistor M6.

In this embodiment, optionally, both the first light-emitting transistor M5 and the second light-emitting transistor M6 are low-temperature poly-silicon transistors, Then, the first light-emitting control signal provided by the first light-emitting control terminal E1 is at a low voltage and controls the first light-emitting transistor M5 to be turned on; and the first light-emitting control signal provided by the first light-emitting control terminal E1 is at a high voltage and controls the first light-emitting transistor M5 to be turned off. The second light-emitting control signal provided by the second light-emitting control terminal E2 is at a low voltage and controls the second light-emitting transistor M6 to be turned on; and the second light-emitting control signal provided by the second light-emitting control terminal E2 is at a high voltage and controls the second light-emitting transistor M6 to be turned off. In other embodiments, optionally, both the first light-emitting transistor and the second light-emitting transistor are metal oxide transistors.

The working process of the pixel circuit 10 includes a non-light-emitting stage and a light-emitting stage, where the non-light-emitting stage includes a reset stage, a compensation stage, and a data write stage. In the non-light-emitting stage, both the first light-emitting transistor M5 and the second light-emitting transistor M6 are turned off, and the pixel circuit 10 executes the reset stage, the compensation stage, and the data write stage. In the light-emitting stage, both the first light-emitting transistor M5 and the second light-emitting transistor M6 are turned on, and the drive transistor M0 provides a drive current for the light-emitting element 20.

Figure 18:
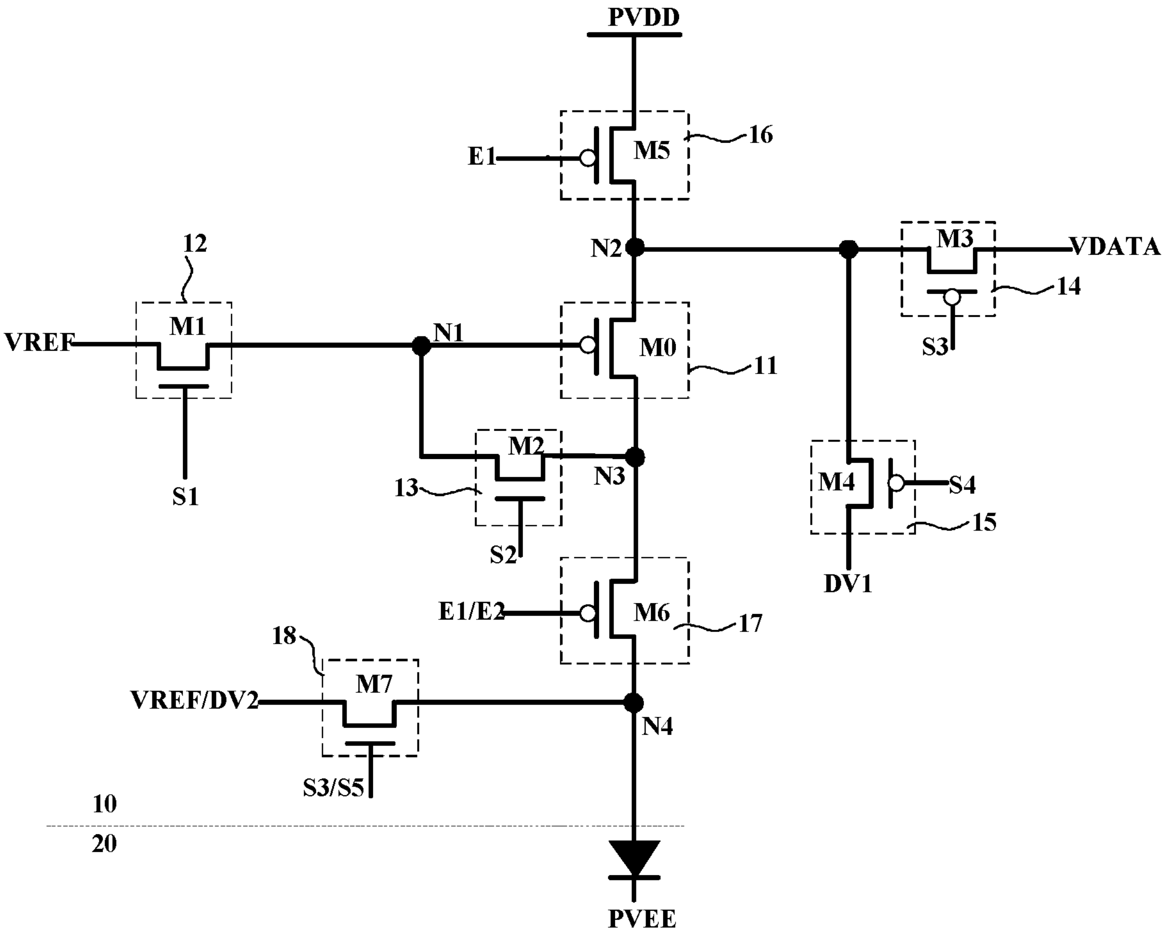
FIG. 18 is a schematic diagram of another pixel circuit according to an embodiment of the present disclosure.

FIG. 18 is a schematic diagram of another pixel circuit according to an embodiment of the present disclosure. As shown in FIG. 18, optionally, the first light-emitting control terminal E1 and the second light-emitting control terminal E2 of the pixel circuit 10 are coupled to the same light-emitting control line. Then, the light-emitting control signal provided by the light-emitting control line is at a low voltage and controls both the first light-emitting transistor M5 and the second light-emitting transistor M6 to be turned on; and the light-emitting control signal provided by the light-emitting control line is at a high voltage and controls both the first light-emitting transistor M5 and the second light-emitting transistor M6 to be turned off.

Referring to FIGS. 4 and 15, optionally, the pixel circuit 10 also includes an initialization module 18, and the initialization module 18 is connected between an initialization signal terminal DV2 and the light-emitting element 20, and the control terminal of the initialization module 18 is connected to a fifth scan terminal S5. Optionally, the initialization module 18 includes an initialization transistor M7, and the initialization signal terminal DV2 provides an initialization signal.

In this embodiment, optionally, the input terminal of the initialization module 18 is connected to the initialization signal terminal DV2, the control terminal of the initialization module 18 is connected to the fifth scan terminal S5, and the output terminal of the initialization module 18 is connected to a node N4. The node N4 is coupled to a first electrode of the light-emitting element 20, and a second electrode of the light-emitting element 20 is connected to a second power terminal PVEE. Optionally, the first electrode of the light-emitting element 20 is an anode, and the second electrode of the light-emitting element 20 is a cathode. The scan signal provided by the fifth scan terminal S5 control the initialization module 18 to be turned on or off. When the initialization module 18 is turned on, the initialization signal provided by the initialization signal terminal DV2 is written to the first electrode of the light-emitting element 20. Generally, the first power terminal PVDD is at a high voltage, the second power terminal PVEE is at a low voltage, and the initialization signal terminal DV2 is at a low voltage, but is not limited thereto; and when the structure of the pixel circuit is changed, the signal provided by each power terminal or signal terminal may be changed accordingly.

Optionally, the initialization transistor M7 is a low-temperature poly-silicon transistor. Then, when the scan signal provided by the fifth scan terminal S5 is at a low voltage, the scan signal controls the initialization transistor M7 to be turned on; and when the scan signal provided by the fifth scan terminal S5 is at a high voltage, the scan signal controls the initialization transistor M7 to be turned off. In other embodiments, optionally, the initialization transistor is a metal oxide transistor.

As shown in FIG. 18, optionally, the reset signal terminal VREF and initialization signal terminal DV2 are coupled to the same reference voltage line. Optionally, the third scan terminal S3 and the fifth scan terminal S5 are coupled to the same scan signal line.

The working process of the pixel circuit 10 includes a non-light-emitting stage and a light-emitting stage, where the non-light-emitting stage also includes an initialization stage. In the initialization stage, the scan signal provided by the fifth scan terminal S5 controls the initialization transistor M7 to be turned on, then the initialization signal is written to the first electrode of the light-emitting element 20 to reset the light-emitting element 20 so that the bias voltage effect of the previous image on the drive transistor M0 can be attenuated.

Optionally, the reset signal terminal VREF and the initialization signal terminal DV2 are coupled to the same reference voltage line. The reference voltage line provides the same reference voltage to the reset signal terminal VREF and the initialization signal terminal DV2. Then, in the reset stage, the reference voltage is written to the gate N1 of the drive transistor M0 to reset the drive transistor M0; and in the initialization stage, the reference voltage is written to the first electrode of the light-emitting element 20 to reset the light-emitting element 20. In this way, the original initialization signal line in the pixel circuit 10 can be saved, the layout size of the pixel circuit 10 can be reduced, and it is also advantageous for the display panel to achieve the narrow bezel.

In the non-light-emitting stage of the pixel circuit 10, the second light-emitting control module 17 is turned off. The non-light-emitting stage of the pixel circuit 10 includes an initialization stage and a data write stage. In this embodiment, optionally, the first data write transistor M3 and the initialization transistor M7 may be low-temperature polysilicon transistors, then the third scan terminal S3 and the fifth scan terminal S5 may be coupled to the same scan signal line so that the initialization stage coincides with the data write stage. In this way, the scan signal line driving the initialization module 18 in the pixel circuit 10 may be saved, and the circuit driving the initialization module 18 in the bezel of the display panel may be saved accordingly, thereby facilitating the narrow bezel of the display panel.

Optionally, the display panel includes a display region and a non-display region surrounding the display region, where the display region includes multiple rows of pixel circuits arranged in a column direction, the non-display region includes a first scan driver circuit including cascaded first scan drive units; and one stage first scan drive unit of the first scan drive units drives pixel circuits in two adjacent rows.

Figure 19:
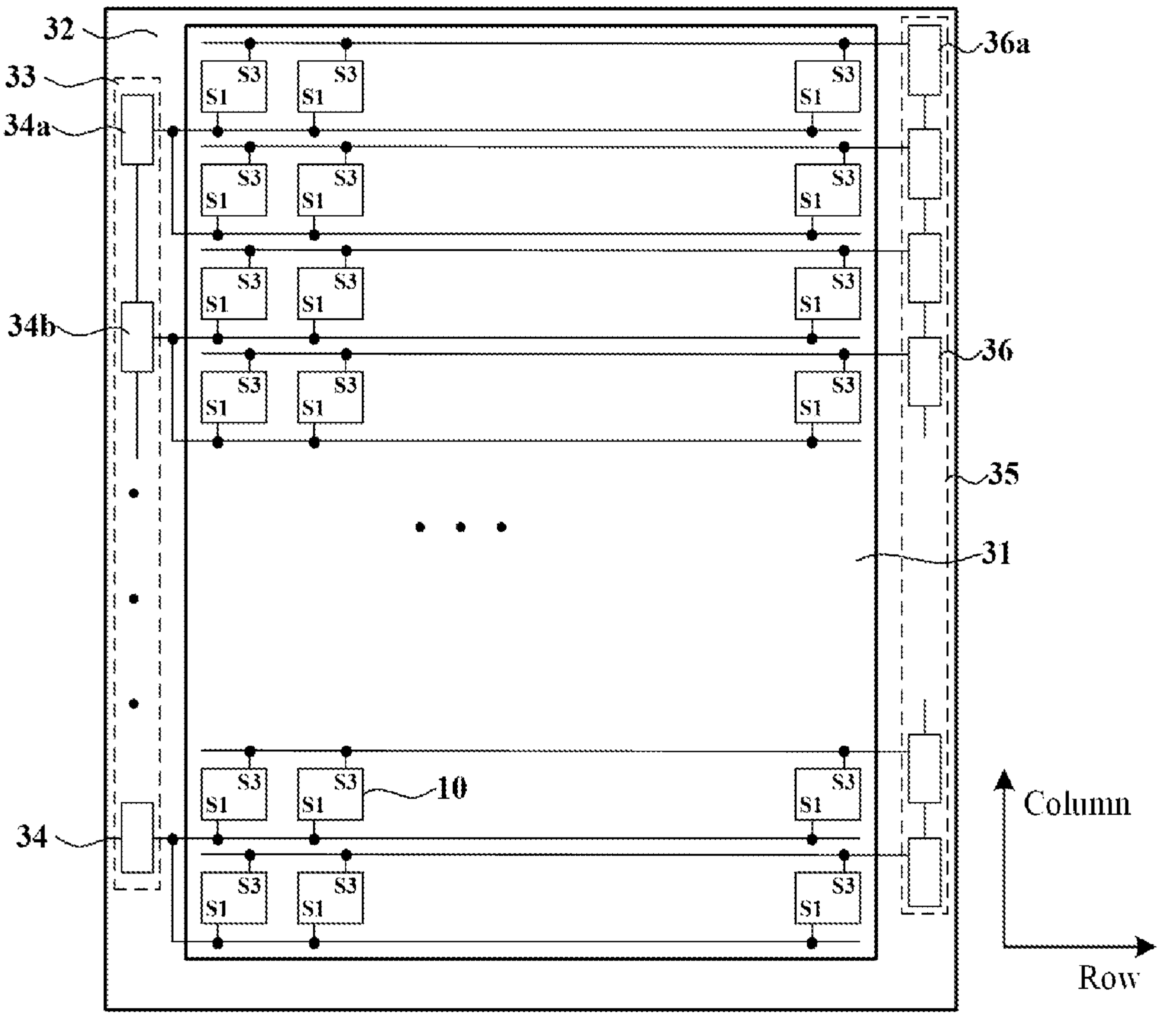
FIG. 19 is a schematic diagram of another display panel according to an embodiment of the present disclosure.

FIG. 19 is a schematic diagram of another display panel according to an embodiment of the present disclosure. As shown in FIG. 19, the display panel includes a display region 31 and a non-display region 32 surrounding the display region 31, where the display region 31 includes multiple rows of pixel circuits 10 arranged in a column direction, the non-display region 32 includes a first scan driver circuit 33 including cascaded first scan drive units 34. Optionally, one stage first scan drive unit 34 drives pixel circuits 10 in two adjacent rows. In other embodiments, optionally, one stage first scan drive unit 34 drives one row of pixel circuits. It is to be noted that one stage first scan drive unit 34 drives pixel circuits 10 in two adjacent rows. Specifically, one stage first scan drive unit 34 provides scan signals to the same modules of the pixel circuits 10 in two adjacent rows. For example, one stage first scan drive unit 34 provides the scan signals to the first scan terminals S1 of the pixel circuits 10 in two adjacent rows.

In this embodiment, compared with one stage first scan drive unit 34 driving one row of pixel circuits, that one stage first scan drive unit 34 drives the pixel circuits in two adjacent rows reduces the number of first scan drive units 34 in the first scan driver circuit 33 so that the bezel size of the display panel can be reduced, thereby achieving the narrow bezel of display panel.

Referring to FIG. 19, optionally, the display panel includes a display region 31 and a non-display region 32 surrounding the display region 31, where the display region 31 includes multiple rows of pixel circuits 10 arranged in a column direction, the non-display region 32 includes a second scan driver circuit 35 including cascaded second scan drive units 36, and one stage second scan drive unit 36 of the second scan drive units 36 is connected to control terminals of first data write modules of pixel circuits 10 in one row. The control terminal of the first data write module in the pixel circuit is the third scan terminal S3. Taking the pixel circuits 10 in the first row as an example, the pixel circuits 10 in the first row are connected to the first stage second scan drive unit 36*a*. If the first stage second scan drive unit 36*a* provides effective scan signals, the first data write module of each pixel circuit 10 in the first row is turned on, and the data signal received by the data signal terminal in the pixel circuit 10 is written to the drive transistor of the pixel circuit 10.

Optionally, the output terminal of an i-th stage first scan drive unit is electrically connected to control terminals of reset modules of pixel circuits in a (2i−1)-th row and control terminals of reset modules of pixel circuits in a 2i-th row, where i is a positive integer greater than or equal to 1. The control terminal of the reset module of the pixel circuit is the first scan terminal S1.

Referring to FIG. 19, the output terminal of the first stage first scan drive unit 34*a* is electrically connected to the first scan terminals S1 of the pixel circuits 10 in the first row. The output terminal of the first stage first scan drive unit 34*a* is also electrically connected to the first scan terminal S1 of the pixel circuits 10 in the second row. Then, the pixel circuits 10 in the first row and the second row perform reset operations simultaneously.

The output terminal of the second stage first scan drive unit 34*b* is electrically connected to the first scan terminals S1 of the pixel circuits 10 in the third row. The output terminal of the second stage first scan drive unit 34*b* is also electrically connected to the first scan terminals S1 of the pixel circuits 10 in the fourth row. Then, the pixel circuit 10 in the third row and the fourth row perform reset operations simultaneously.

Similarly, the output terminal of the i-th stage first scan drive unit is electrically connected to the control terminals of the reset modules of the pixel circuits in the (2i−1)-th row and the control terminals of the reset modules of the pixel circuits in the 2i-th row, the pixel circuits in the (2i−1)-th row and the 2i-th row perform reset operations simultaneously.

If the scan signals output by the first scan drive unit 34 are effective pulses, i.e. effective scan signals, then the reset modules 12 of the pixel circuits 10 in adjacent two rows correspondingly driven by the scan signals are turned on, and the reset signals are transmitted to the gates N1 of the drive transistors M0 of the pixel circuits 10. If the scan signals output by the first scan drive unit 34 are ineffective pulses, i.e. ineffective scan signals, then the reset modules 12 of the pixel circuits 10 in adjacent two rows correspondingly driven by the scan signals are turned off. The cascaded first scan drive units 34 in the first scan driver circuit 33 output sequentially the effective scan signals. In the case where the reset transistor M1 is an n-type transistor, the effective scan signal output by the first scan drive unit 34 is at an high voltage and the ineffective scan signal output by the first scan drive unit 34 is at a low voltage.

Optionally, the control terminal of the i-th stage first scan drive unit is electrically connected to control terminals of compensation modules of pixel circuits in the (2i−9)-th row and control terminals of compensation modules of pixel circuits in the (2i−8)-th row, where i is a positive integer greater than or equal to 5. The control terminal of the compensation module in the pixel circuit is the second scan terminal.

Figure 20:
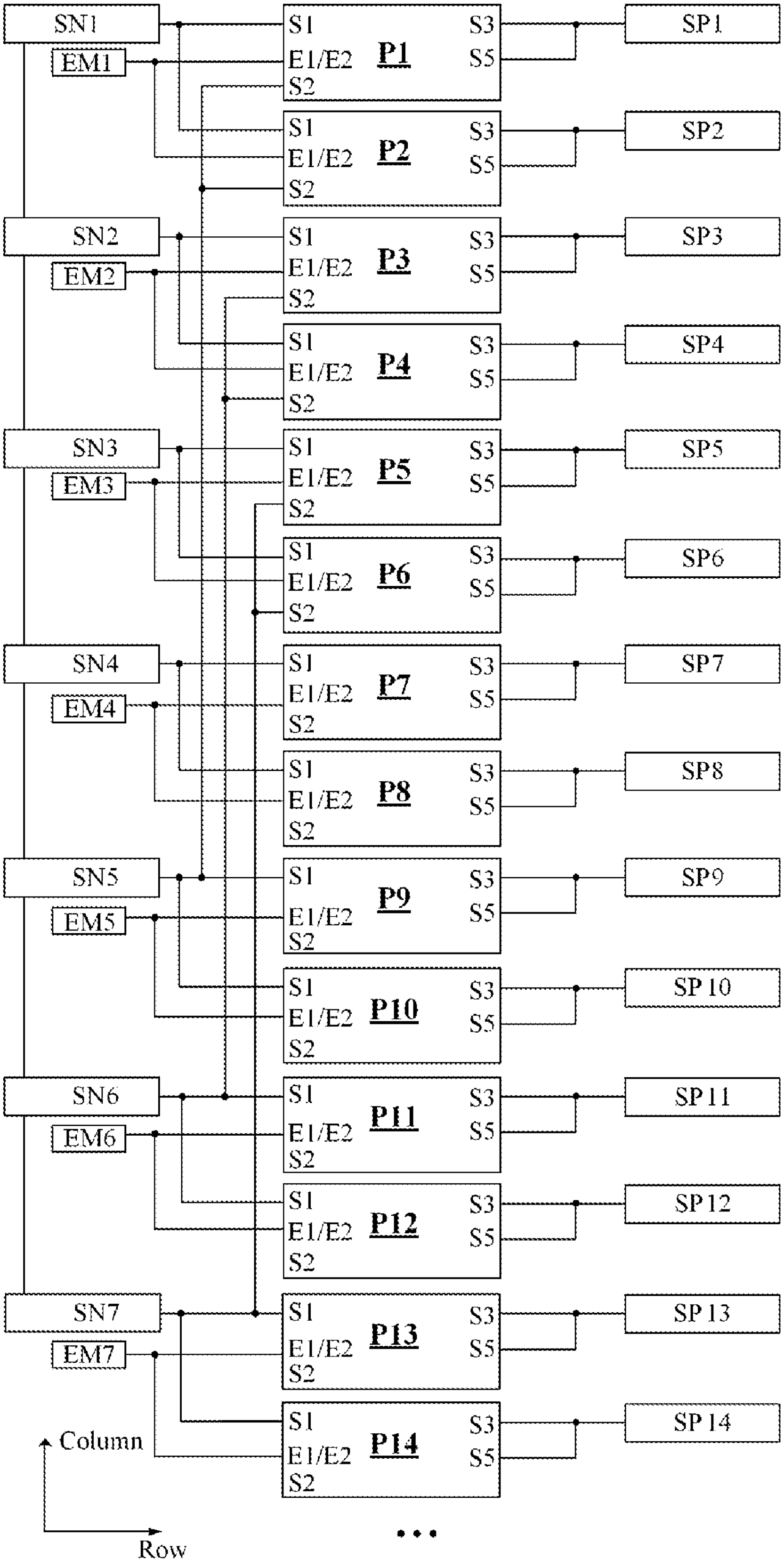
FIG. 20 is a schematic diagram of another display panel according to an embodiment of the present disclosure.

FIG. 20 is a schematic diagram of another display panel according to an embodiment of the present disclosure. As shown in FIG. 20, the display panel includes a pixel circuit P1 in the first row, a pixel circuit P2 in the second row, a pixel circuit P3 in the third row, and so on. The first scan driver circuit includes cascaded first scan drive units labeled sequentially as SN1, SN2, SN3, SN4, SN5, SN6 and so on. The output terminal of the first stage first scan drive unit SN1 is electrically connected to the first scan terminal S1 of each pixel circuit 10 in the pixel circuits P1 in the first row and the pixel circuits P2 in the second row, the output terminal of the second stage first scan drive unit SN2 is electrically connected to the first scan terminal S1 of each pixel circuit in the pixel circuits P3 in the third row and the pixel circuits P4 in the fourth row, and the output terminal of the third stage first scan drive unit SN3 is electrically connected to the first scan terminal S1 of each pixel circuit 10 in the pixel circuits P5 in the fifth row and the pixel circuits P6 in the sixth row, and so on.

The second scan driver circuit includes cascaded second scan drive units labeled sequentially as SP1, SP2, SP3, SP4, SP5, SP6 and so on. In the case where the third scan terminal S3 and the fifth scan terminal S5 are coupled to the same scan signal line, the output terminal of the first stage second scan drive unit SP1 is electrically connected to the third scan terminal S3 and the fifth scan terminal S5 of each pixel circuit 10 in the pixel circuits P1 in the first row, the output terminal of the second stage second scan drive unit SP2 is electrically connected to the third scan terminal S3 and the fifth scan terminal S5 of each pixel circuit 10 in the pixel circuits P2 in the second row, and the output terminal of the third stage second scan drive unit SP3 is electrically connected to the third scan terminal S3 and the fifth scan terminal S5 of each pixel circuit 10 in the pixel circuits P3 in the third row, and so on.

In this embodiment, the first scan drive unit provides the scan signal to the control terminal of the reset module of the pixel circuit, and the first scan drive unit also provides the scan signal to the control terminal of the compensation module of the pixel circuit. Specifically, the output terminal of the fifth stage first scan drive unit SN5 is electrically connected to the second scan terminal S2 of each pixel circuit 10 in the pixel circuits P1 in the first row and the pixel circuits P2 in the second row, the output terminal of the sixth stage first scan drive unit SN6 is electrically connected to the second scan terminal S1 of each pixel circuit 10 in the pixel circuits P3 in the third row and the pixel circuits P4 in the fourth row, and the output terminal of the seventh stage first scan drive unit SN7 is electrically connected to the second scan terminal S2 of each pixel circuit 10 in the pixel circuits P5 in the fifth row and the pixel circuits P6 in the sixth row, and so on. In this case, the first scan drive unit uses a one-drive-four drive mode so that the area occupied by the scan driver circuit in the non-display region is reduced, facilitating achieving the narrow bezel of the display panel.

In FIG. 20, the display panel includes an independently disposed light-emitting driver circuit including cascaded light-emitting drive units labeled sequentially as EM1, EM2, EM3, EM4, EM5, EM6, and so on. The output terminal of the first stage light-emitting drive unit EM1 is electrically connected to the first light-emitting control terminal E1 and the second light-emitting control terminal E2 of each pixel circuit 10 in the pixel circuits P1 in the first row and the pixel circuits P2 in the second row, the output terminal of the second stage light-emitting drive unit EM2 is electrically connected to the first light-emitting control terminal E1 and the second light-emitting control terminal E2 of each pixel circuit 10 in the pixel circuits P3 in the third row and the pixel circuits P4 in the fourth row, and the output terminal of the third stage light-emitting drive unit EM3 is electrically connected to the first light-emitting control terminal E1 and the second light-emitting control terminal E2 of each pixel circuit 10 in the pixel circuits P5 in the fifth row and the pixel circuits P6 in the sixth row, and so on. In this case, the light-emitting drive unit uses a one-drive-two drive mode so that the area occupied by the light-emitting driver circuit in the non-display region is reduced, facilitating achieving the narrow bezel of the display panel.

Figure 21:
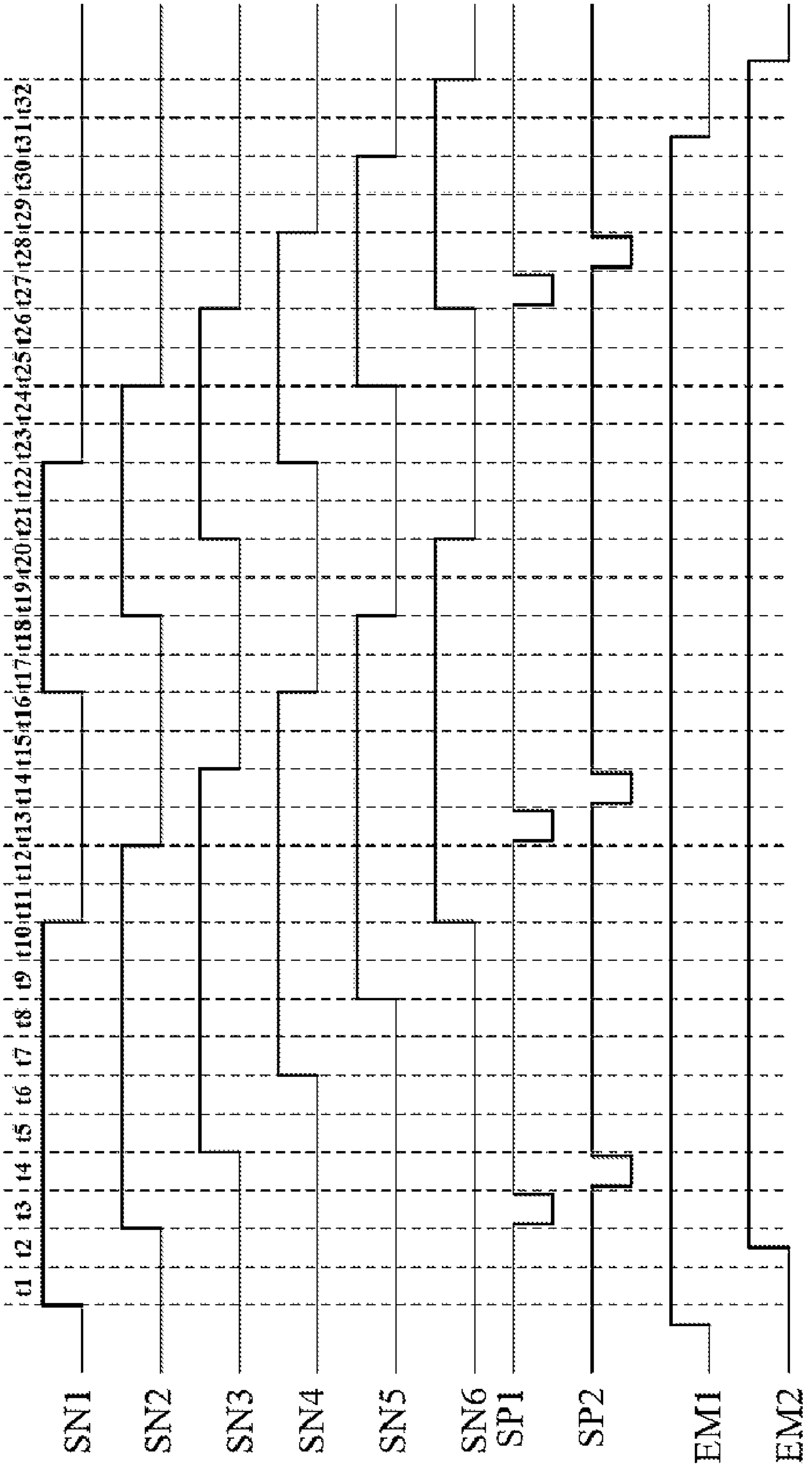
FIG. 21 is a timing diagram of the display panel of FIG. 20.

FIG. 21 is a timing diagram of the display panel of FIG. 20. Referring to FIGS. and 21, the working process of the pixel circuit 10 therein is described by taking the pixel circuit P1 in the first row as an example. Optionally, the structure of the pixel circuit 10 is as shown in FIG. 4.

In stages t1 to t8, the first stage first scan drive unit SN1 provides a high voltage to make the reset transistor M1 of the pixel circuit 10 turned on, the reset signal written to the gate N1 of the drive transistor M0, and the drive transistor M0 turned on; and the fifth stage first scan drive unit SN5 provides a low voltage to make the compensation transistor M2 turned off. In stage t3, the first stage second scan drive unit SP1 provides a low voltage to make the first data write transistor M3 and the initialization transistor M7 of the pixel circuit 10 turned on, the data signal written to the input terminal N2 and the output terminal N3 of the drive transistor M0, and the reset signal written to the first electrode N4 of the light-emitting element 20. Then, the gate N1 of the drive transistor M0 is at a low voltage, and the input terminal N2 and the output terminal N3 of the drive transistor M0 are at high voltages so that the drive transistor M0 is negatively biased once and also the light-emitting element 20 is reset once.

In stages t9 to t10, the reset transistor M1 of the pixel circuit 10 keeps on, and the drive transistor M0 keeps on; and the fifth stage first scan drive unit SN5 provides a high voltage to make the compensation transistor M2 of the pixel circuit 10 turned on, and the reset signal written to three terminals of the drive transistor M0. Then, the same reset signal is written to three terminals of the drive transistor M0 to reset three terminals of the drive transistor M0 once.

In stages t11 to t16, the first stage first scan drive unit SN1 provides a low voltage to make the reset transistor M1 of the pixel circuit 10 turned off and the compensation transistor M2 kept on. In stage t13, the first stage second scan drive unit SP1 provides a low voltage to make the first data write transistor M3 and the initialization transistor M7 of the pixel circuit 10 turned on, the data signal written to three terminals of the drive transistor M0 until the drive transistor M0 is turned off, and the reset signal written to the first electrode N4 of the light-emitting element 20. Then, the same data signal is written to three terminals of the drive transistor M0 to perform the data writing on the drive transistor M0 once and also reset the light-emitting element twice.

In stages t17 to t22, the reset transistor M1 of the pixel circuit 10 is turned on, the reset signal is written to the gate N1 of the drive transistor M0, and the drive transistor M0 is turned on. In stages t17 to t18, the compensation transistor M2 of the pixel circuit 10 keeps on, and the reset signal is written to three terminals of the drive transistor M0. Then, the same reset signal is written to three terminals of the drive transistor M0 to perform a second reset on three terminals of the drive transistor M0.

In stages t25 to t30, the reset transistor M1 of the pixel circuit 10 is turned off, and the compensation transistor M2 is turned on. In stage t27, the first stage second scan drive unit SP1 provides a low voltage to make the first data write transistor M3 and the initialization transistor M7 of the pixel circuit 10 turned on, the data signal of the pixel circuit 10 in this row is written to three terminals of the drive transistor M0 until the drive transistor M0 is turned off, and the reset signal is written to the first electrode N4 of the light-emitting element 20. Then, the same data signal is written to three terminals of the drive transistor M0 to perform the data writing on the drive transistor M0 twice and also reset the light-emitting element 20 thrice.

It is to be understood that when the output terminal of the n-th stage light-emitting drive unit EMn provides an ineffective light-emitting control signal, then each pixel circuit of the pixel circuits in the (2n−1)-th row and the pixel circuits in the 2n-th row is in the non-light-emitting stage, where the pixel circuit performs the reset stage, the compensation stage, and the data write stage. For example, in stages t1 to t30, the output terminal of the first stage light-emitting drive unit EM1 provides an ineffective light-emitting control signal, then each pixel circuit of the pixel circuits P1 in the first row and the pixel circuits P2 in the second row is in the non-light-emitting stage, where each pixel circuit of the pixel circuits P1 in the first row and the pixel circuits P2 in the second row performs the reset stage, the compensation stage, and the data write stage.

In this embodiment, the drive transistor is reset multiple times and performed the data writing multiple times, and the light-emitting element is reset multiple times so that the bias voltage effect of the previous image on the drive transistor can be eliminated and the smear problem is improved. Each drive unit in the driver circuit uses a multi-drive design, and one drive unit correspondingly drives multiple rows of pixel circuits so that the area occupied by the driver circuit in the non-display region can be reduced, facilitating achieving the narrow bezel of the display panel.

Figure 22:
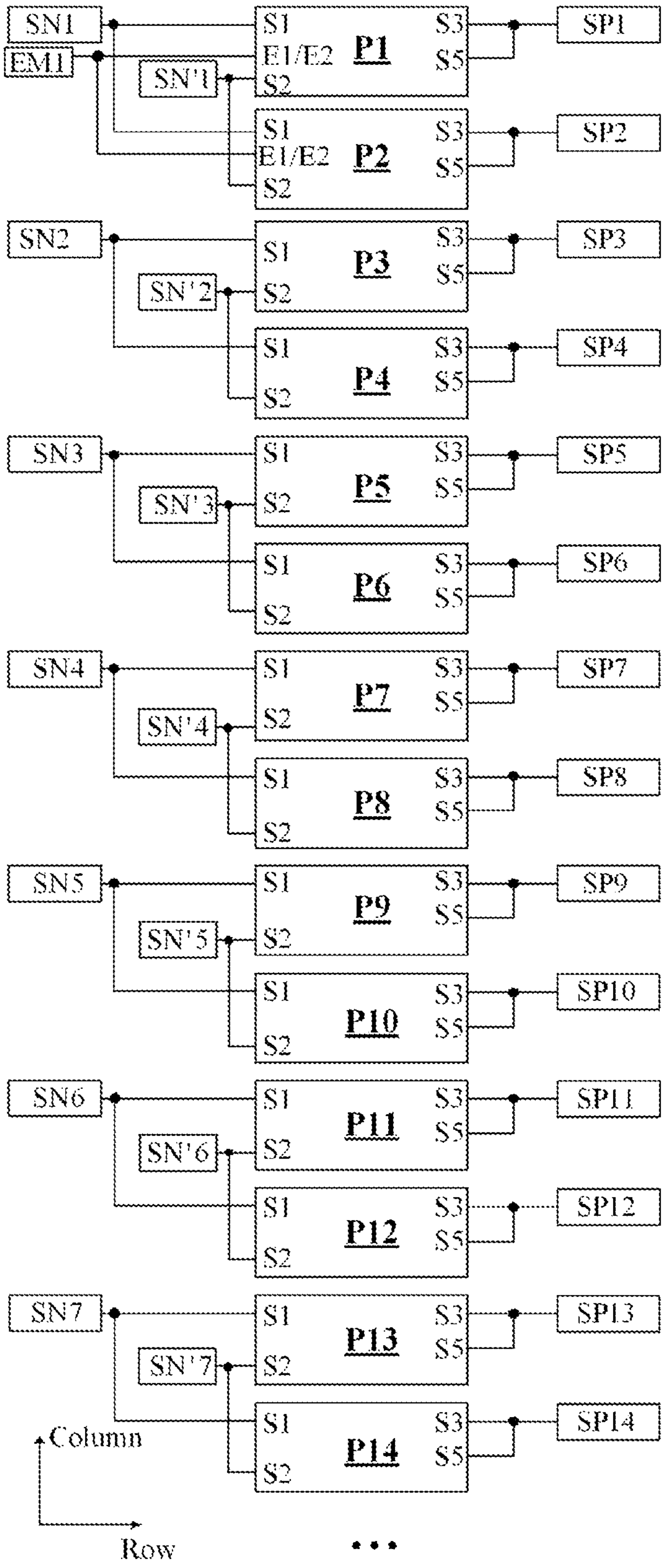
FIG. 22 is a schematic diagram of another display panel according to an embodiment of the present disclosure.

FIG. 22 is a schematic diagram of another display panel according to an embodiment of the present disclosure. The difference from FIG. 20 lies in that the display panel in FIG. 22 includes an independently disposed compensation driver circuit including cascaded compensation drive units labeled as SN'1, SN'2, SN'3, SN'4, SN'5, SN'6 and so on. The output terminal of the first stage compensation drive unit SN'1 is electrically connected to the second scan terminal S2 of each pixel circuit 10 in the pixel circuits P1 in the first row and the pixel circuits P2 in the second row, the output terminal of the second stage compensation drive unit SN'2 is electrically connected to the second scan terminal S2 of each pixel circuit 10 in the pixel circuits P3 in the third row and the pixel circuits P4 in the fourth row, and the output terminal of the third stage compensation drive unit SN'3 is electrically connected to the second scan terminal S2 of each pixel circuit 10 in the pixel circuits P5 in the fifth row and the pixel circuits P6 in the sixth row, and so on.

Figure 23:
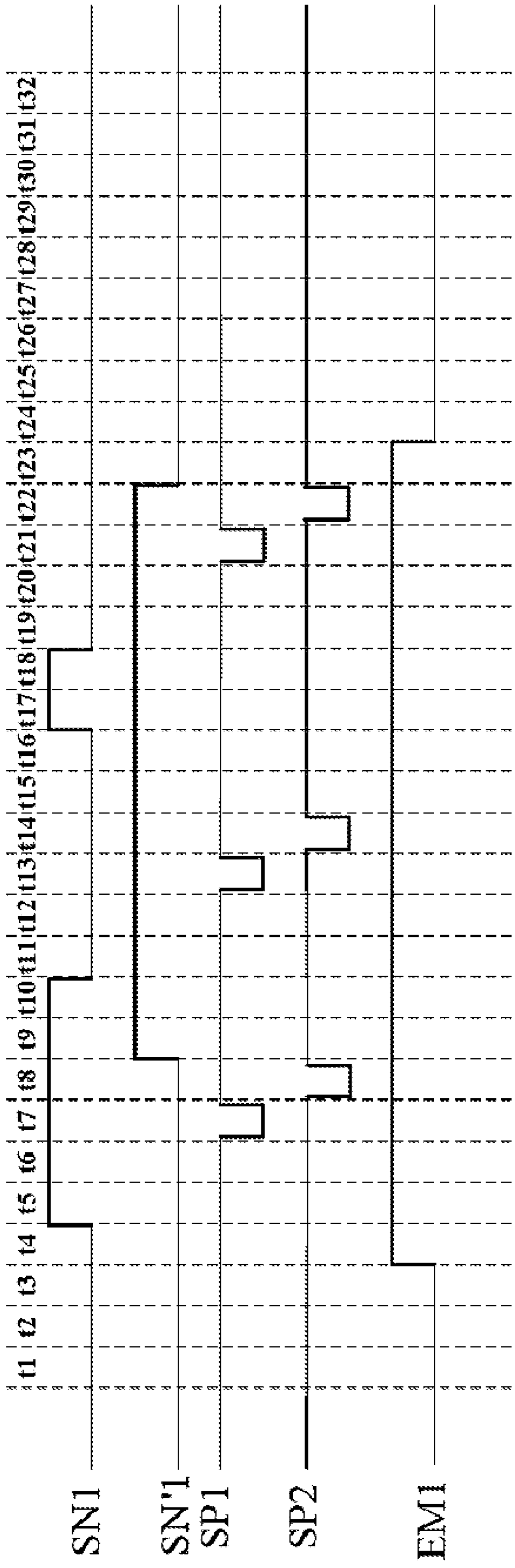
FIG. 23 is a timing diagram of the display panel of FIG. 22.

FIG. 23 is a timing diagram of the display panel of FIG. 22. Referring to FIGS. 22 and 23, the working process of the pixel circuit 10 therein is described by taking the pixel circuit P1 in the first row as an example. Optionally, the structure of the pixel circuit 10 is as shown in FIG. 4.

In stages t4 to t23, the output terminal of the first stage light-emitting drive unit EM1 provides an ineffective light-emitting control signal, then each pixel circuit of the pixel circuits P1 in the first row and the pixel circuits P2 in the second row is in the non-light-emitting stage, where each pixel circuit of the pixel circuits P1 in the first row and the pixel circuits P2 in the second row performs the reset stage, the compensation stage, and the data write stage. The details are as follows.

In stages t5 to t8, the first stage scan drive unit SN1 provides a high voltage to make the reset transistor M1 of the pixel circuit 10 turned on, the reset signal written to the gate N1 of the drive transistor M0, and the drive transistor M0 turned on; and the first stage compensation drive unit SN'1 provides a low voltage to make the compensation transistor M2 turned off. In stage t7, the first stage second scan drive unit SP1 provides a low voltage to make the first data write transistor M3 and the initialization transistor M7 of the pixel circuit 10 turned on, the data signal written to the input terminal N2 and the output terminal N3 of the drive transistor M0, and the reset signal written to the first electrode N4 of the light-emitting element 20. Then, the gate N1 of the drive transistor M0 is at a low voltage, and the input terminal N2 and the output terminal N3 of the drive transistor M0 are at high voltages, and the drive transistor M0 is negatively biased once and also the light-emitting element 20 is reset once.

In stages t9 to t10, the reset transistor M1 of the pixel circuit 10 keeps on, and the drive transistor M0 keeps on; and the first stage compensation drive unit SN'1 provides a high voltage to make the compensation transistor M2 of the pixel circuit 10 turned on, and the reset signal written to three terminals of the drive transistor M0. Then, the same reset signal is written to three terminals of the drive transistor M0 to reset three terminals of the drive transistor M0 once.

In stages t11 to t16, the first stage first scan drive unit SN1 provides a low voltage to make the reset transistor M1 of the pixel circuit 10 turned off; and the compensation transistor M2 keeps on. In stage t13, the first stage second scan drive unit SP1 provides a low voltage to make the first data write transistor M3 and the initialization transistor M7 of the pixel circuit 10 turned on, the data signal written to three terminals of the drive transistor M0 until the drive transistor M0 is turned off, and the reset signal written to the first electrode N4 of the light-emitting element 20. Then, the same data signal is written to three terminals of the drive transistor M0, and the data writing is performed on the drive transistor M0 once and the light-emitting element 20 is reset twice.

In stages t17 to t18, the reset transistor M1 of the pixel circuit 10 is turned on, the reset signal is written to the gate N1 of the drive transistor M0, and the drive transistor M0 is turned on; and the compensation transistor M2 of the pixel circuit 10 keeps on, and the reset signal is written to three terminals of the drive transistor M0. Then, the same reset signal is written to three terminals of the drive transistor M0 to perform a second reset on three terminals of drive transistor M0.

In stages t19 to t22, the reset transistor M1 of the pixel circuit 10 is turned off, and the compensation transistor M2 is turned on. In stage t21, the first stage second scan drive unit SP1 provides a low voltage to make the first data write transistor M3 and the initialization transistor M7 of the pixel circuit 10 turned on, the data signal of the pixel circuit 10 in this row is written to three terminals of the drive transistor M0 until the drive transistor M0 is turned off, and the reset signal is written to the first electrode N4 of the light-emitting element 20. Then, the same data signal is written to three terminals of the drive transistor M0 to perform the data writing on the drive transistor M0 twice and also reset the light-emitting element 20 thrice.

In this embodiment, the drive transistor is reset multiple times and performed the data writing multiple times, and the light-emitting element is reset multiple times, so that the bias voltage effect of the previous image on the drive transistor can be eliminated and the smear problem is improved. Each scan drive unit in the first scan driver circuit is used for controlling the reset module in the pixel circuit to be turned on or off. Each compensation drive unit in the compensation driver circuit is used for controlling the compensation module in the pixel circuit to be turned on or off. Then, the duration of the non-light-emitting stage of the pixel circuit in one row is reduced, thereby reducing the refresh duration of one frame and improving the refresh rate.

Figure 24:
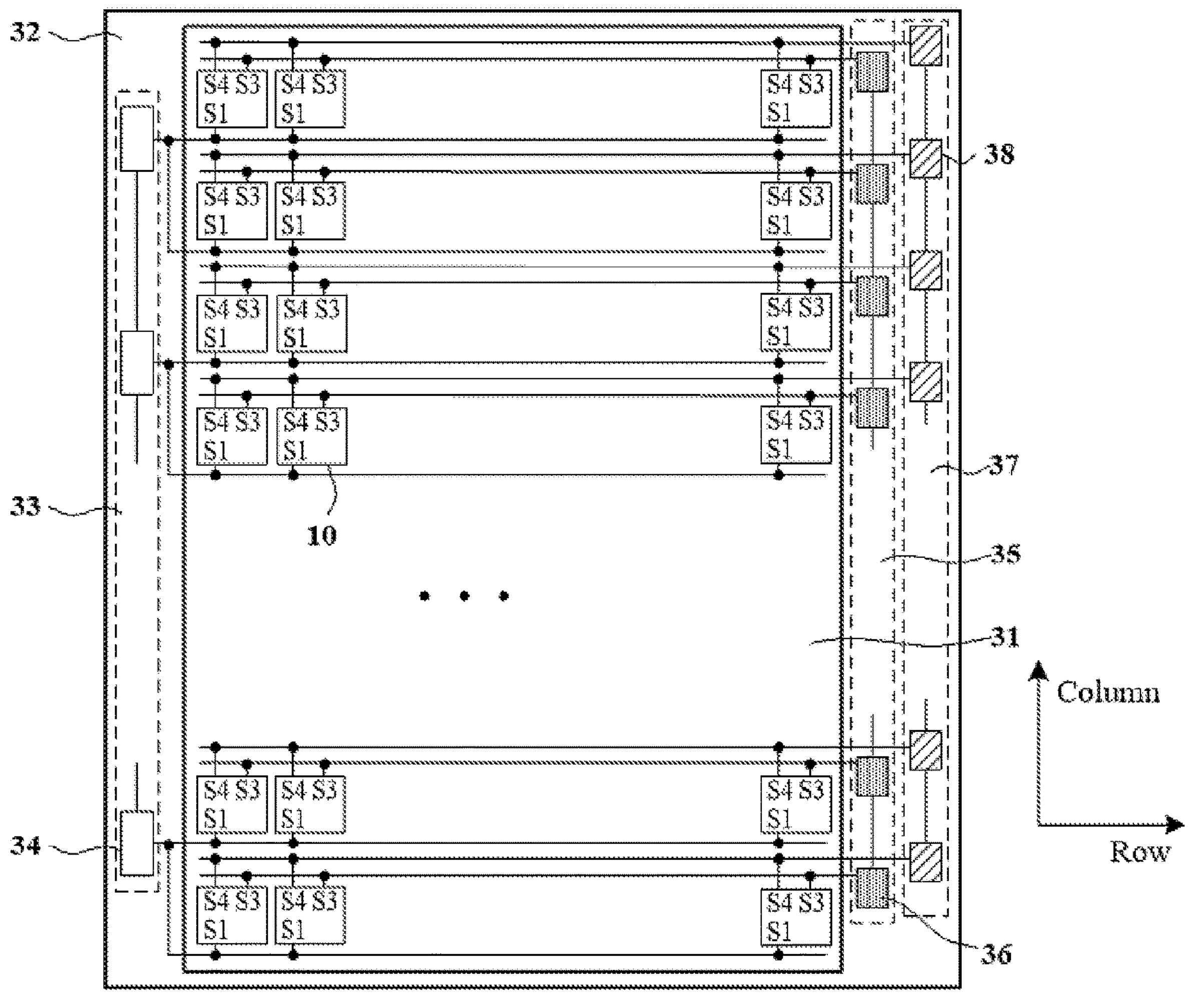
FIG. 24 is a schematic diagram of another display panel according to an embodiment of the present disclosure.

Optionally, the display panel includes a display region and a non-display region surrounding the display region, where the display region includes multiple rows of pixel circuits arranged in a column direction, the non-display region includes a third scan driver circuit including cascaded third scan drive units; and one stage third scan drive unit is connected to the control terminals of the second data write modules of the pixel circuits in at least one row. FIG. 24 is a schematic diagram of another display panel according to an embodiment of the present disclosure. As shown in FIG. 24, the display panel includes a display region 31 and a non-display region 32 surrounding the display region 31, where the display region 31 includes multiple rows of pixel circuits 10 arranged in a column direction. Optionally, the pixel circuit in the display panel is as shown in FIG. 18, the pixel circuit 10 includes a second data write module 15, where the control terminal of the second data write module 15 is connected to a fourth scan terminal S4.

The non-display region 32 includes a first scan driver circuit 33 including cascaded first scan drive units 34. Optionally, one stage first scan drive unit 34 provides a scan signal for the first scan terminal S1 of each pixel circuit 10 in two adjacent rows, and the scan signal is used for controlling the reset module 12 in the pixel circuit 10 to be turned on or off. One stage first scan drive unit 34 uses a one-drive-two design so that the area occupied by the scan drive units in non-display region 32 can be reduced, and the narrow bezel of the display panel can be achieved. Optionally, one stage first scan drive unit 34 also provides the scan signal for the second scan terminal S2 of each pixel circuit 10 in two adjacent rows and the scan signal is used for controlling the compensation module 13 in the pixel circuit 10 to be turned on or off so that the area occupied by the scan drive units in the non-display region 32 can be reduced and the narrow bezel of the display panel can be achieved.

The non-display region 32 includes a second scan driver circuit 35 including cascaded second scan drive units 36. Optionally, one stage second scan drive unit 34 provides the scan signal for the third scan terminal S3 of each pixel circuit 10 in one row and the scan signal is used for controlling the first data write module in the pixel circuit to be turned on or off. Optionally, one stage second scan drive unit 36 also provides the scan signal for the fifth scan terminal S5 of each pixel circuit 10 in one row and the scan signal is used for controlling the initialization module 18 in the pixel circuit 10 to be turned on or off. Then, the area occupied by the scan drive units in the non-display region 32 can be further reduced and the narrow bezel of the display panel can be achieved.

The non-display region 32 includes a third scan driver circuit 37 including cascaded third scan drive units 38. Optionally, one stage third scan drive unit 38 provides the scan signal for the fourth scan terminal S4 of each pixel circuit 10 in one row and the scan signal is used for controlling the second data write module 15 in the pixel circuit 10 to be turned on or off. In other embodiments, optionally, one stage third scan drive unit provides the scan signal to the fourth scan terminal of each pixel circuit in two adjacent rows, and one stage third scan drive unit uses a one-drive-two design so that the area occupied by the scan drive units in the non-display region can be reduced and the narrow bezel of the display panel can be achieved.

In this embodiment, at least one scan drive unit provides the scan signals to two different scan terminals in the pixel circuit so that the area occupied by the scan drive units in the non-display region can be reduced and the narrow bezel of the display panel can be achieved. It is also possible to reduce the number of scan signal lines connected to the pixel circuit, reduce the layout size of the pixel circuit, and facilitate achieving the high resolution of the display panel.

However, it is not limited thereto. When required by the design, as shown in FIG. 15, each scan terminal in the pixel circuit 10 may also be driven using a different scan signal line, then the non-display region of the display panel includes at least seven scan driver circuits for driving the pixel circuit 10, and each scan driver circuit includes cascaded scan drive units. The cascaded scan drive unit in the first scan driver circuit is used for providing the scan signal for the first scan terminal S1 of the pixel circuit 10 in the display region to control ON/OFF of the reset module 12 of the pixel circuit 10. The cascaded scan drive unit in the second scan driver circuit is used for providing the scan signal for the second scan terminal S2 of the pixel circuit 10 in the display region to control ON/OFF of the compensation module 13 of the pixel circuit 10. The cascaded scan drive unit in the third scan driver circuit is used for providing the scan signal for the third scan terminal S3 of the pixel circuit 10 in the display region to control ON/OFF of the first data write module 14 of the pixel circuit 10. The cascaded scan drive unit in the fourth scan driver circuit is used for providing the scan signal for the fourth scan terminal S4 of the pixel circuit 10 in the display region to control ON/OFF of the second data write module 15 of the pixel circuit 10. The cascaded scan drive unit in the fifth scan driver circuit is used for providing the scan signal for the fifth scan terminal S5 of the pixel circuit 10 in the display region to control ON/OFF of the initialization module 18 of the pixel circuit 10. The cascaded scan drive unit in the sixth scan driver circuit is used for providing the light-emitting control signal for the first light-emitting control terminal E1 of the pixel circuit 10 in the display region to control ON/OFF of the first light-emitting control module 16 of the pixel circuit 10. The cascaded scan drive unit in the seventh scan driver circuit is used for providing the light-emitting control signal for the second light-emitting control terminal E2 of the pixel circuit 10 in the display region to control ON/OFF of the second light-emitting control module 17 of the pixel circuit 10.

Figure 25:
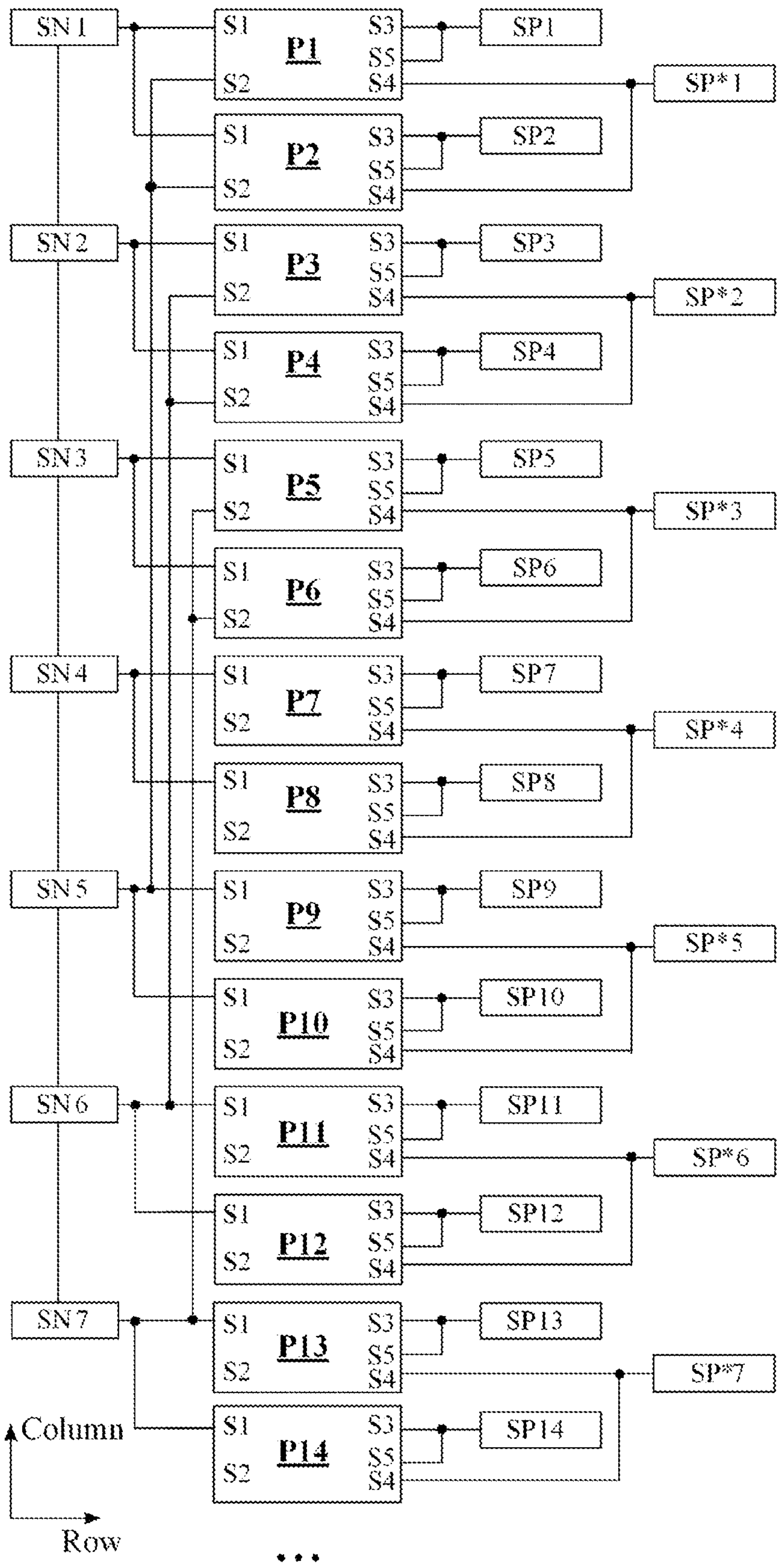
FIG. 25 is a schematic diagram of another display panel according to an embodiment of the present disclosure.

FIG. 25 is a schematic diagram of another display panel according to an embodiment of the present disclosure. As shown in FIG. 25, the display panel includes a pixel circuit P1 in the first row, a pixel circuit P2 in the second row, a pixel circuit P3 in the third row, and so on. The first scan driver circuit includes cascaded first scan drive units labeled sequentially as SN1, SN2, SN3, SN4, SN5, SN6, and so on. The output terminal of the first stage first scan drive unit SN1 is electrically connected to the first scan terminal S1 of each pixel circuit 10 in the pixel circuits P1 in the first row and the pixel circuits P2 in the second row, the output terminal of the second stage first scan drive unit SN2 is electrically connected to the first scan terminal S1 of each pixel circuit in the pixel circuits P3 in the third row and the pixel circuits P4 in the fourth row, and the output terminal of the third stage first scan drive unit SN3 is electrically connected to the first scan terminal S1 of each pixel circuit 10 in the pixel circuits P5 in the fifth row and the pixel circuits P6 in the sixth row, and so on.

In this embodiment, the first scan drive unit provides the scan signal to the control terminal of the reset module of the pixel circuit, and the first scan drive unit also provides the scan signal to the control terminal of the compensation module of the pixel circuit. Specifically, the output terminal of the fifth stage first scan drive unit SN5 is electrically connected to the second scan terminal S2 of each pixel circuit 10 in the pixel circuits P1 in the first row and the pixel circuits P2 in the second row, the output terminal of the sixth stage first scan drive unit SN6 is electrically connected to the second scan terminal S2 of each pixel circuit 10 in the pixel circuits P3 in the third row and the pixel circuits P4 in the fourth row, and the output terminal of the seventh stage first scan drive unit SN7 is electrically connected to the second scan terminal S2 of each pixel circuit 10 in the pixel circuits P5 in the fifth row and the pixel circuits P6 in the sixth row, and so on.

The second scan driver circuit includes cascaded second scan drive units labeled sequentially as SP1, SP2, SP3, SP4, SP5, SP6, and so on. In the case where the third scan terminal S3 and the fifth scan terminal S5 are coupled to the same scan signal line, the output terminal of the first stage second scan drive unit SP1 is electrically connected to the third scan terminal S3 and the fifth scan terminal S5 of each pixel circuit 10 in the pixel circuits P1 in the first row, the output terminal of the second stage second scan drive unit SP2 is electrically connected to the third scan terminal S3 and the fifth scan terminal S5 of each pixel circuit 10 in the pixel circuits P2 in the second row, and the output terminal of the third stage second scan drive unit SP3 is electrically connected to the third scan terminal S3 and the fifth scan terminal S5 of each pixel circuit 10 in the pixel circuits P3 in the third row, and so on.

The third scan driver circuit includes cascaded third scan drive units labeled sequentially as SP*1, SP*2, SP3, SP*4, SPAS, SP*6, and so on. The output terminal of the first stage third scan drive unit SP*1 is electrically connected to the fourth scan terminal S4 of each pixel circuit 10 in the pixel circuits P1 in the first row and the pixel circuits P2 in the second row, the output terminal of the second stage third scan drive unit SP*2 is electrically connected to the fourth scan terminal S4 of each pixel circuit 10 in the pixel circuits P3 in the third row and the pixel circuits P4 in the fourth row, and the output terminal of the third stage third scan drive unit SP*3 is electrically connected to the fourth scan terminal S4 of each pixel circuit 10 in the pixel circuits P5 in the fifth row and the pixel circuits P6 in the sixth row, and so on.

Figure 26:
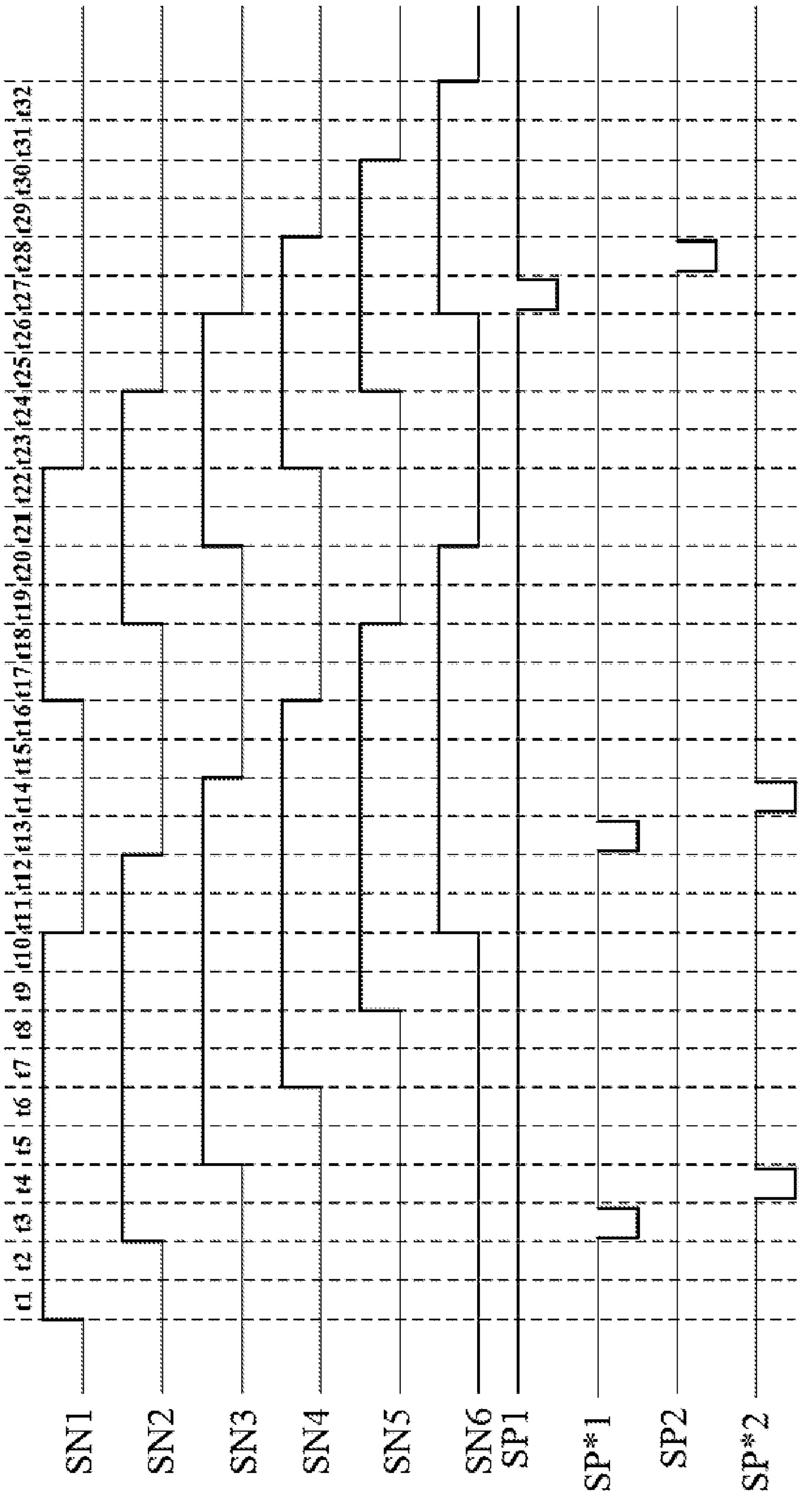
FIG. 26 is a timing diagram of the display panel of FIG. 25.

FIG. 26 is a timing diagram of the display panel of FIG. 25. Referring to FIGS. and 26, the working process of the pixel circuit 10 therein is described by taking the pixel circuit P1 in the first row as an example. Optionally, the structure of the pixel circuit 10 is as shown in FIG. 18.

In stages t1 to t8, the first stage first scan drive unit SN1 provides a high voltage to make the reset transistor M1 of the pixel circuit 10 turned on, the reset signal written to the gate N1 of the drive transistor M0, and the drive transistor M0 turned on; the fifth stage first scan drive unit SN5 provides a low voltage to make the compensation transistor M2 turned off; and the first stage second scan drive unit SP1 provides a high voltage to make the first data write transistor M3 and the initialization transistor M7 turned off. In stage t3, the first stage third scan drive unit SP*1 provides a low voltage to make the second data write transistor M4 turned on, and the high voltage signal provided by the first signal terminal DV1 is written to the input terminal N2 and the output terminal N3 of the drive transistor M0. Then, the gate N1 of the drive transistor M0 is at a low voltage, and the input terminal N2 and the output terminal N3 of the drive transistor M0 are at high voltages so that the drive transistor M0 is negatively biased once.

In stages t9 to t10, the reset transistor M1 keeps on, and the drive transistor M0 keeps on; and the fifth stage first scan drive unit SN5 provides a high voltage to make the compensation transistor M2 turned on, and the reset signal written to three terminals of the drive transistor M0. Then, the same reset signal is written to three terminals of the drive transistor M0 to reset the three terminals of the drive transistor M0 once.

In stages t11 to t16, the first stage first scan drive unit SN1 provides a low voltage to make the reset transistor M1 turned off, and the compensation transistor M2 kept on; and the first data write transistor M3 and the initialization transistor M7 kept off. In stage t3, the first stage third scan drive unit SP*1 provides a low voltage to make the second data write transistor M4 turned on, and the high voltage signal provided by the first signal terminal DV1 is written to three terminals of the drive transistor M0 until the drive transistor M0 is turned off. Then, the same data signal is written to three terminals of the drive transistor M0 to perform the data writing on the drive transistor M0 once.

In stages t17 to t22, the reset transistor M1 is turned on, the reset signal is written to the gate N1 of the drive transistor M0, and the drive transistor M0 are turned on. In stages t17 to t18, the compensation transistor M2 keeps on, and the reset signal is written to three terminals of the drive transistor M0. Then, the same reset signal is written to three terminals of the drive transistor M0 to perform a second reset on three terminals of the drive transistor M0.

In stages t25 to t30, the reset transistor M1 is turned off, the compensation transistor M2 is turned on, and the second data write transistor M4 is turned off. In stage t27, the first stage second scan drive unit SP1 provides a low voltage to make the first data write transistor M3 and the initialization transistor M7 turned on, the data signal of the pixel circuit in this row written to three terminals of the drive transistor M0 until the drive transistor M0 is turned off, and the reset signal written to the first electrode N4 of the light-emitting element 20. Then, the same data signal is written to three terminals of the drive transistor M0 to perform the data writing on the drive transistor M0 twice and also reset the light-emitting element 20.

In this embodiment, the drive transistor is reset multiple times and performed data writing multiple times to eliminate the bias voltage effect of the previous image on the drive transistor and improve the smear problem.

Figure 27:
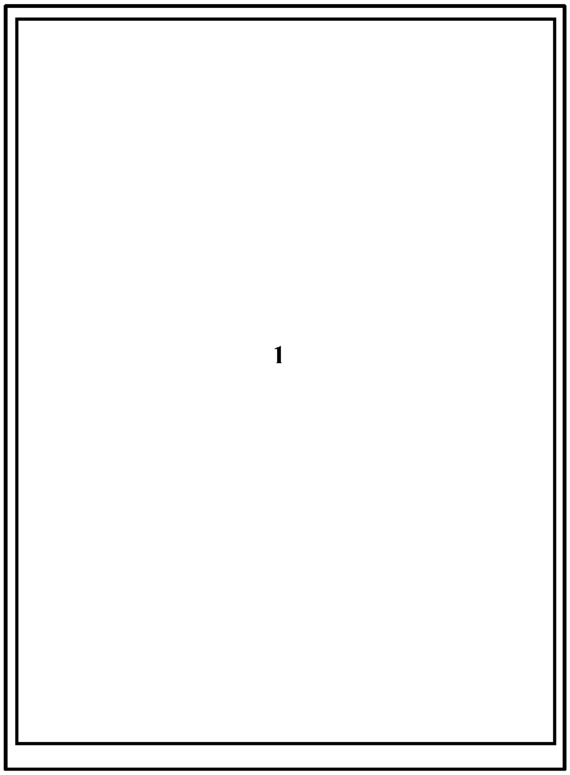
FIG. 27 is a schematic diagram of a display device according to an embodiment of the present disclosure.

Based on the same concept, an embodiment of the present disclosure also provides a display device including the above display panel. Optionally, the display panel is the display panel is an organic light-emitting display panel or a micro LED display panel and is not limited thereto. FIG. 27 is a schematic diagram of a display device according to an embodiment of the present disclosure. As shown in FIG. 27, optionally, the display device is applied to an electronic device 1 such as a smartphone, a tablet computer, or the like. It is understood that the preceding embodiments provide only part of the structure of the display panel and the pixel circuit, the display panel also includes other structures, and details are not described herein.

The preceding embodiments do not limit the scope of the present disclosure. It is to be understood by those skilled in the art that various modifications, combinations, sub-combinations and substitutions can be performed according to design requirements and other factors. Any modifications, equivalent substitutions and improvements within the spirit and principle of the present disclosure fall within the scope of the claims of the present disclosure.

What is claimed is:

1. A display panel, comprising a pixel circuit and a light-emitting element, wherein the pixel circuit comprises a drive module, a reset module, and a compensation module;

wherein a first terminal of the drive module is coupled to the light-emitting element and is configured to provide a drive current for the light-emitting element, and the drive module comprises a drive transistor;

the reset module is connected between a reset signal terminal and a control terminal of the drive module and is configured to provide a reset signal for the drive module;

the compensation module is connected between the control terminal of the drive module and the first terminal of the drive module and is configured to compensate for a threshold voltage of the drive transistor; and a working process of the pixel circuit comprises a reset stage and a compensation stage, wherein in the reset stage, the reset module is configured to be turned on;

in the compensation stage, the compensation module is configured to be turned on;

a partial time period of the reset stage coincides with a partial time period of the compensation stage; and a start time of the reset stage is earlier than a start time of the compensation stage.

2. The display panel of claim 1, wherein the reset module comprises a reset transistor, wherein a gate of the reset transistor is connected to a first scan terminal; and wherein the compensation module comprises a compensation transistor, wherein a gate of the compensation transistor is connected to a second scan terminal.

3. The display panel of claim 1, wherein a control terminal of the reset module is connected to a first scan terminal, and a control terminal of the compensation module is connected to a second scan terminal; and the first scan terminal and the second scan terminal are coupled to a same scan signal line.

4. The display panel of claim 1, wherein the pixel circuit further comprises a first data write module, wherein the first data write module is connected between a data signal terminal and a second terminal of the drive module, and a control terminal of the first data write module is connected to a third scan terminal; and the working process of the pixel circuit comprises a first data write stage, wherein in the first data write stage, the first data write module is configured to be turned on.

5. The display panel of claim 1, wherein the pixel circuit further comprises a first light-emitting control module and a second light-emitting control module, wherein the first light-emitting control module is connected between a first power supply terminal and a second terminal of the drive module, and a control terminal of the first light-emitting control module is connected to a first light-emitting control terminal;

the second light-emitting control module is connected between the first terminal of the drive module and the light-emitting element, and a control terminal of the second light-emitting control module is connected to a second light-emitting control terminal; and wherein the first light-emitting control terminal and the second light-emitting control terminal are coupled to a same light-emitting control line.

6. The display panel of claim 1, wherein the display panel comprises a display region and a non-display region surrounding the display region, wherein the display region comprises a plurality of rows of pixel circuits arranged in a column direction;

the non-display region comprises a first scan driver circuit comprising cascaded first scan drive units; and one stage first scan drive unit of the first scan drive units is configured to drive pixel circuits in two adjacent rows.

7. The display panel of claim 6, wherein an output terminal of an i-th stage first scan drive unit is electrically connected to control terminals of reset modules of pixel circuits in a (2i−1)-th row and control terminals of reset modules of pixel circuits in a 2i-th row, wherein i is a positive integer greater than or equal to 1; or wherein an output terminal of the i-th stage first scan drive unit is electrically connected to control terminals of compensation modules of pixel circuits in a (2i−9)-th row and control terminals of compensation modules of pixel circuits in a (2i−8)-th row, wherein i is a positive integer greater than or equal to 5.

8. The display panel of claim 4, wherein the first data write stage is disposed after the reset stage, and a partial time period of the compensation stage coincides with the first data write stage.

9. The display panel of claim 4, wherein the working process of the pixel circuit comprises a second data write stage, wherein a start time of the second data write stage is later than or equal to the start time of the reset stage, and an end time of the second data write stage is earlier than or equal to the start time of the compensation stage.

10. The display panel of claim 4, wherein the pixel circuit further comprises a second data write module, wherein the second data write module is connected between a first signal terminal and the second terminal of the drive module, a control terminal of the second data write module is connected to a fourth scan terminal;

at the first data write stage, the second data write module is configured to be turned off; and wherein the first data write module comprises a first data write transistor, wherein a gate of the first data write transistor is connected to the third scan terminal; and the second data write module comprises a second data write transistor, wherein a gate of the second data write transistor is connected to the fourth scan terminal.

11. The display panel of claim 10, wherein the display panel comprises a display region and a non-display region surrounding the display region, wherein the display region comprises a plurality of rows of pixel circuits arranged in a column direction;

the non-display region comprises a third scan driver circuit comprising cascaded third scan drive units; and one stage third scan drive unit of the third scan drive units is connected to control terminals of second data write modules of pixel circuits in at least one row.

12. The display panel of claim 4, wherein the pixel circuit further comprises an initialization module;

wherein the initialization module is connected between an initialization signal terminal and the light-emitting element, and a control terminal of the initialization module is connected to a fifth scan terminal;

wherein the reset signal terminal and the initialization signal terminal are coupled to a same reference voltage line; and wherein the third scan terminal and the fifth scan terminal are coupled to a same scan signal line.

13. The display panel of claim 4, wherein the display panel comprises a display region and a non-display region surrounding the display region, wherein the display region comprises a plurality of rows of pixel circuits arranged in a column direction;

the non-display region comprises a second scan driver circuit comprising cascaded second scan drive units; and one stage second scan drive unit of the second scan drive units is connected to control terminals of first data write modules of pixel circuits in one row.

14. The display panel of claim 8, wherein the compensation stage comprises a first compensation stage and a second compensation stage that are disposed at intervals; and a partial time period of the reset stage coincides with a partial time period of the first compensation stage, and a partial time period of the second compensation stage coincides with the first data write stage.

15. The display panel of claim 8, wherein the reset stage comprises a first reset stage and a second reset stage that are disposed at intervals;

a partial time period of the first reset stage coincides with a partial time period of the compensation stage; and the partial time period of the compensation stage is multiplexed as the second reset stage.

16. The display panel of claim 15, wherein the working process of the pixel circuit comprises a third data write stage, wherein the third data write stage is disposed between the first reset stage and the second reset stage, and the partial time period of the compensation stage is further multiplexed as the third data write stage.

17. The display panel of claim 14, wherein the partial time period of the reset stage further coincides with the partial time period of the second compensation stage.

18. The display panel of claim 14, wherein the reset stage comprises a first reset stage and a second reset stage that are disposed at intervals;

a partial time period of the first reset stage coincides with a partial time period of the first compensation stage; and a partial time period of the second reset stage coincides with a partial time period of the first compensation stage.

19. A display device, comprising a display panel, wherein the display panel comprises a pixel circuit and a light-emitting element, and the pixel circuit comprises a drive module, a reset module, and a compensation module;

wherein a first terminal of the drive module is coupled to the light-emitting element and is configured to provide a drive current for the light-emitting element, and the drive module comprises a drive transistor;

the reset module is connected between a reset signal terminal and a control terminal of the drive module and is configured to provide a reset signal for the drive module;

the compensation module is connected between the control terminal of the drive module and the first terminal of the drive module and is configured to compensate for a threshold voltage of the drive transistor; and a working process of the pixel circuit comprises a reset stage and a compensation stage, wherein in the reset stage, the reset module is configured to be turned on;

in the compensation stage, the compensation module is configured to be turned on;

a partial time period of the reset stage coincides with a partial time period of the compensation stage; and a start time of the reset stage is earlier than a start time of the compensation stage.

* * * * *